(12) United States Patent
Zhao et al.

(10) Patent No.: US 10,151,062 B2
(45) Date of Patent: Dec. 11, 2018

(54) DISPERSE DYE COMPOSITION, DISPERSE DYE AND PREPARATION METHOD AND USE THEREOF

(71) Applicant: Zhejiang Runtu Co., Ltd., Zhejiang (CN)

(72) Inventors: Guosheng Zhao, Zhejiang (CN); Haixing Ruan, Zhejiang (CN); Weidi Gu, Zhejiang (CN); Bailong Chen, Zhejiang (CN); Huaming Ye, Zhejiang (CN); Xueping Jing, Zhejiang (CN)

(73) Assignee: ZHEJIANG RUNTU CO., LTD., Zhejiang (CN)

( * ) Notice: Subject to any disclaimer, the term of this patent is extended or adjusted under 35 U.S.C. 154(b) by 0 days.

(21) Appl. No.: 15/102,669

(22) PCT Filed: Dec. 30, 2014

(86) PCT No.: PCT/CN2014/095585
§ 371 (c)(1),
(2) Date: Jun. 8, 2016

(87) PCT Pub. No.: WO2015/101290
PCT Pub. Date: Jul. 9, 2015

(65) Prior Publication Data
US 2016/0312403 A1    Oct. 27, 2016

(30) Foreign Application Priority Data

Dec. 30, 2013   (CN) .......................... 2013 1 0751286
Dec. 30, 2013   (CN) .......................... 2013 1 0751296
Dec. 30, 2013   (CN) .......................... 2013 1 0751747
Dec. 30, 2013   (CN) .......................... 2013 1 0751841
Dec. 30, 2013   (CN) .......................... 2013 1 0752449
Dec. 30, 2013   (CN) .......................... 2013 1 0753365
Dec. 30, 2013   (CN) .......................... 2013 1 0753414
Dec. 30, 2013   (CN) .......................... 2013 1 0753630

(51) Int. Cl.
| | |
|---|---|
| D06P 1/19 | (2006.01) |
| D06P 3/54 | (2006.01) |
| D06P 1/18 | (2006.01) |
| C09B 67/00 | (2006.01) |
| C09B 67/22 | (2006.01) |

(52) U.S. Cl.
CPC ............ *D06P 1/19* (2013.01); *C09B 67/0051* (2013.01); *D06P 1/18* (2013.01); *D06P 3/54* (2013.01)

(58) Field of Classification Search
CPC ............ D06P 3/54; D06P 1/18; C09B 67/0051
See application file for complete search history.

(56) References Cited

U.S. PATENT DOCUMENTS

| | | | | |
|---|---|---|---|---|
| 5,393,308 | A * | 2/1995 | Lange | .............. C09B 67/0046 8/639 |
| 6,121,352 | A * | 9/2000 | Hoppe | .............. C09B 67/0051 524/190 |
| 7,846,215 | B2 * | 12/2010 | Weber | .............. D06P 3/004 8/115.7 |

FOREIGN PATENT DOCUMENTS

| | | | | |
|---|---|---|---|---|
| CN | 101280123 A | | 10/2008 | |
| CN | 101328320 | * | 12/2008 | |
| CN | 101768376 | | 7/2010 | |
| CN | 102226040 | * | 10/2011 | |
| CN | 102229756 | * | 11/2011 | |
| CN | 103113758 | * | 5/2013 | ............. C09B 67/22 |
| JP | 52059788 | * | 5/1977 | |
| JP | 10077583 | * | 3/1998 | ............. D06P 1/18 |

OTHER PUBLICATIONS

Translation CN 101329320, Dec. 24, 2008.*
Gulrajani M.L., Colour Measurement Principles, advances and Industrial applications, 2010, p. 248.*
Gangakhedar, N.S., Coulour Measurement Methods for Textiles, 2010, pp. 221-252.*
PCT Written Opinion dated Apr. 1, 2015; Application No. PCT/CN2014/095585.

* cited by examiner

*Primary Examiner* — Amina S Khan
(74) *Attorney, Agent, or Firm* — The Dobrusin Law Firm, PC

(57) ABSTRACT

A disperse dye composition, disperse dye and preparation method and use thereof are described. The disperse dye is suitable for fabrics, particularly for dyeing and printing of dacron and blended fabrics thereof.

11 Claims, No Drawings

DISPERSE DYE COMPOSITION, DISPERSE DYE AND PREPARATION METHOD AND USE THEREOF

TECHNICAL FIELD

The present disclosure relates to a disperse dye composition, disperse dye and preparation method and use thereof. Said disperse dye is at least suitable for fabrics, particularly for dyeing and printing of dacron and blended fabrics thereof.

BACKGROUND ART

With growing emphasis on environmental protection, several European countries have issued some legislations and policies. Similarly, higher requirements for environmental protection are raised in China, recently; the heavy polluting enterprises are strictly restricted. Under the circumstance, the first priority that the dyestuff manufacturers encounter is to seek for survival and development. In the dyestuff industry, the opportunities and challenges are realized; therefore novel environmental friendly dyes are progressively developed.

SUMMARY

Technical Problems

The present disclosure provides an economical, environmental friendly disperse dye with broad pH value range, superior fastness to sunlight, excellent compatibility, high strength and superior fastness to washing.

Solution to the Problems

The present disclosure provides a disperse dye composition, comprising or consists of the following components:

Component A as represented by formula (1):

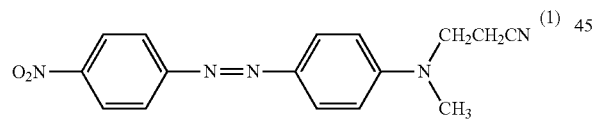

Component B, consists of one or two or more compounds as represented by formula (2):

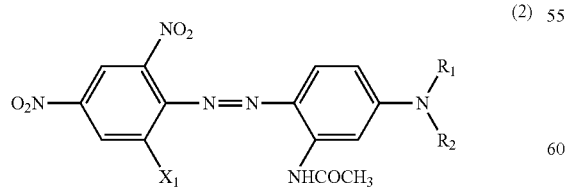

in formula (2), $X_1$ is bromine or chlorine; $R_1$, $R_2$ are each independently a $C_1$~$C_4$ alkyl group;

Component C, consists of one or two or more compounds as represented by formula (3):

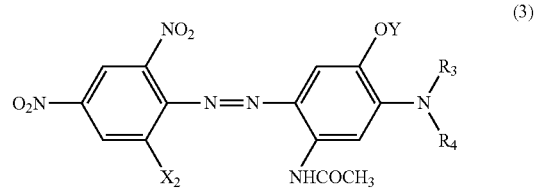

in formula (3), $X_2$ is bromine or chlorine, $R_3$, $R_4$ are each independently a $C_1$~$C_4$ alkyl group or $CH_2CH=CH_2$, Y is a $C_1$~$C_4$ alkyl group;

optionally, Component D, consists of one or two or more compounds as represented by formula (4):

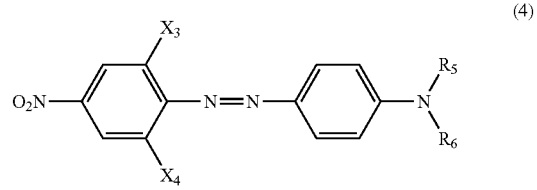

in formula (4), $X_3$, $X_4$ are each independently hydrogen, chlorine or bromine, $R_5$, $R_6$, are each independently a $C_2$~$C_4$ alkyl group, or a $C_1$~$C_4$ alkyl group in which one hydrogen atom is substituted by a cyano group, a phenyl group, an acetoxyl group or a benzoyloxy group; wherein Component D is not C.I. Disperse Orange 76;

optionally, Component E, consists of one or two or more compounds as represented by formula (5):

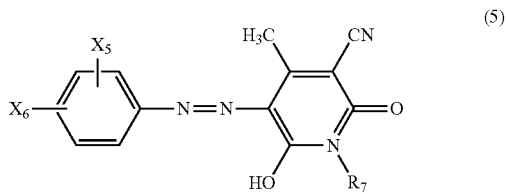

in formula (5), $X_5$, $X_6$ are each independently hydrogen, chlorine or a nitro group, $R_7$ is a $C_1$~$C_4$ alkyl group;

optionally, Component F, consists of one or two or more compounds as represented by formula (6):

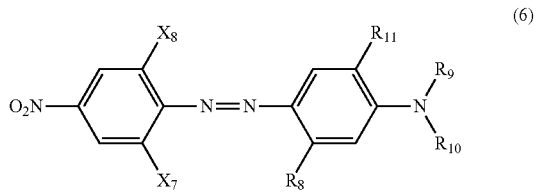

in formula (6), $X_7$, $X_8$ are each independently bromine, chlorine, a cyano group or a nitro group, $R_8$ is a $C_1$~$C_4$ alkylamido group or a $C_1$~$C_4$ alkyl group, $R_9$, $R_{10}$ are each independently a $C_1$~$C_4$ alkyl group, $R_{11}$ is hydrogen or a $C_1$~$C_4$ alkoxy group; and optionally, Component G, as represented by formula (7):

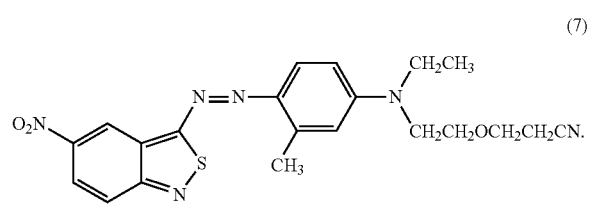

(7)

The disperse dye composition according to the present disclosure, preferably, $X_7$ in formula (6) is a cyano group or a nitro group, $X_8$ is a cyano group, $R_{11}$ is hydrogen.

The disperse dye composition according to the present disclosure, preferably, $X_2$ in formula (3) is chlorine, $X_7$ in formula (6) is a cyano group or a nitro group, $X_8$ is a cyano group, $R_{11}$ is hydrogen.

The disperse dye composition according to the present disclosure, preferably, Component C consists of one or two of a compound as represented by formula (3-1) and a compound as represented by formula (3-2):

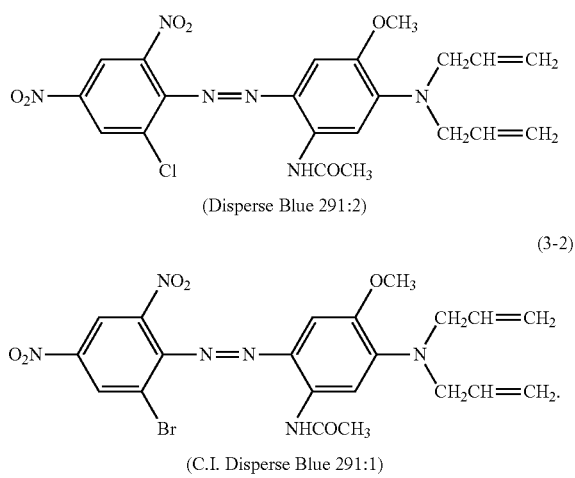

(3-1) (Disperse Blue 291:2)

(3-2) (C.I. Disperse Blue 291:1)

The disperse dye composition according to the present disclosure, preferably, Component B is a compound as represented by formula (2-1):

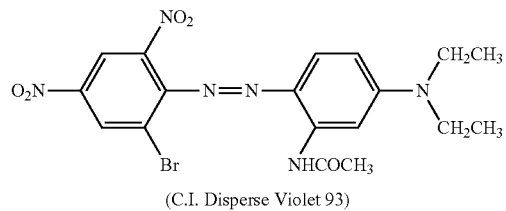

(2-1) (C.I. Disperse Violet 93)

Component C is a compound as represented by formula (3-2):

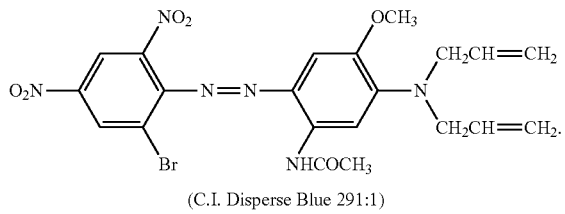

(3-2) (C.I. Disperse Blue 291:1)

and in formula (4), $X_3$, $X_4$ are each independently hydrogen or bromine; in formula (6), $X_7$, $X_8$ are each independently bromine, a cyano group or a nitro group.

The disperse dye composition according to the present disclosure, preferably, said Component B consists of one or two of the following compounds:

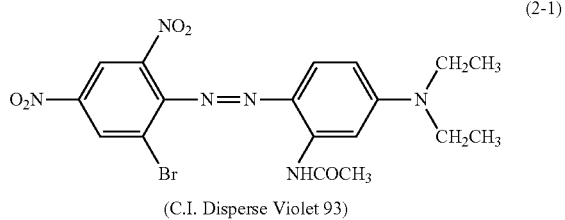

(2-1) (C.I. Disperse Violet 93)

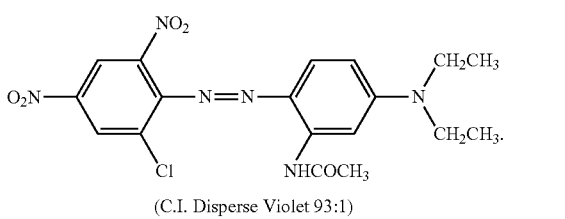

(2-2) (C.I. Disperse Violet 93:1)

The disperse dye composition according to the present disclosure, preferably, said Component C consists of one or two or more of the following compounds:

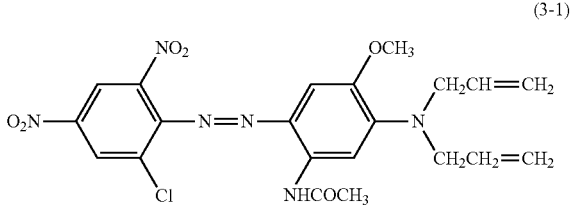

(3-1) (Disperse Blue 291:2)

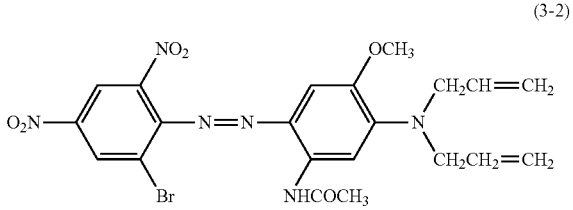

(3-2) (C.I. Disperse Blue 291:1)

(3-3)
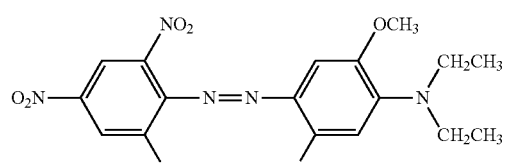
(C.I. Disperse Blue 291)

(3-4)
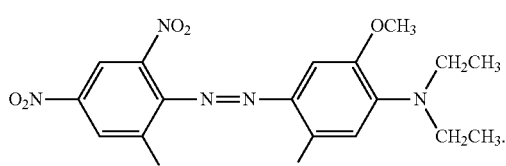
(C.I. Disperse Blue 291)

The disperse dye composition according to the present disclosure, preferably, said Component C consists of one or two of the following compounds:

(3-1)
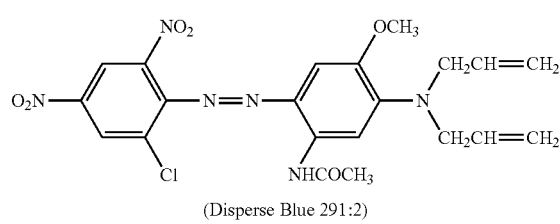
(Disperse Blue 291:2)

(3-4)
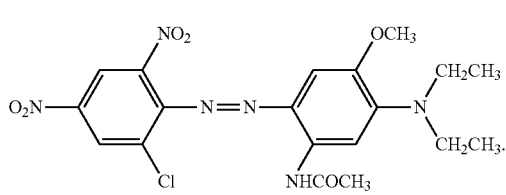

The disperse dye composition according to the present disclosure, preferably, said Component D consists of one or two or more of the following compounds:

(4-1)
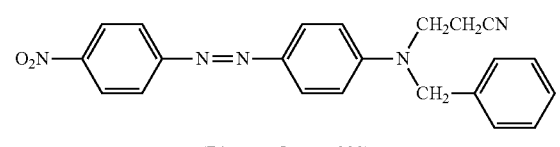
(Disperse Orange 288)

(4-2)
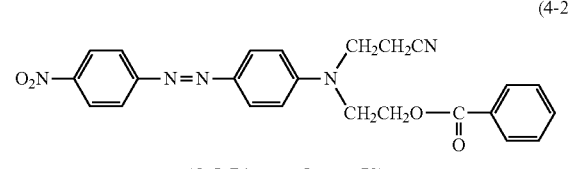
(C. I. Disperse Orange 73)

(4-3)
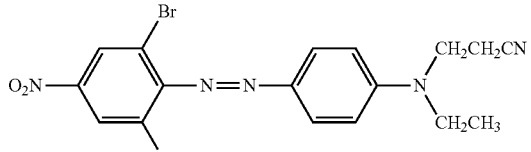
(C. I. Disperse Orange 61)

(4-4)
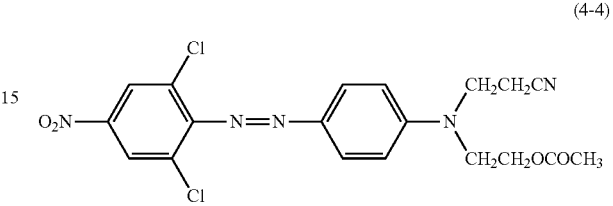
(C. I. Disperse Orange 30)

(4-5)
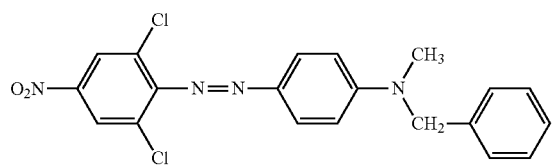
(Disperse Orange 278)

(4-6)
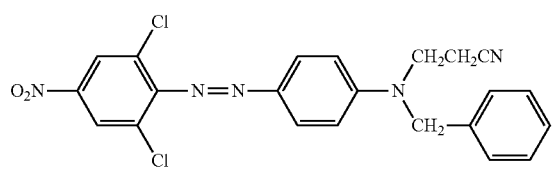
(Disperse Orange 30:2)

(4-7)
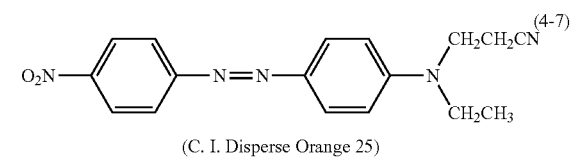
(C. I. Disperse Orange 25)

(4-8)
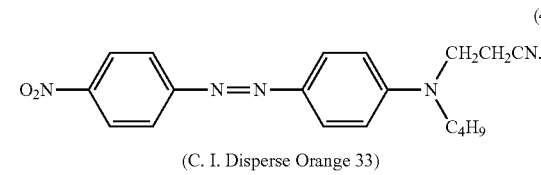
(C. I. Disperse Orange 33)

The disperse dye composition according to the present disclosure, preferably, said Component D consists of one or two or more of the following compounds:

(4-1)
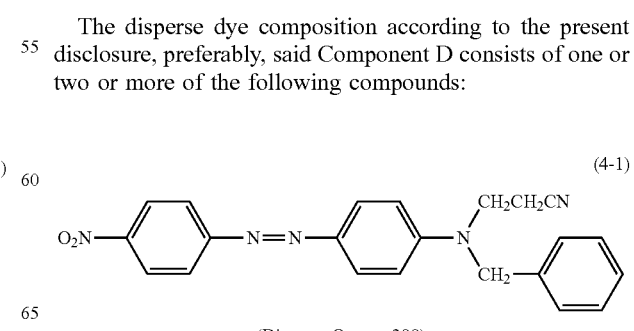
(Disperse Orange 288)

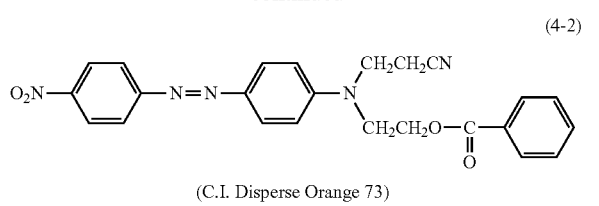

(4-2)

(C.I. Disperse Orange 73)

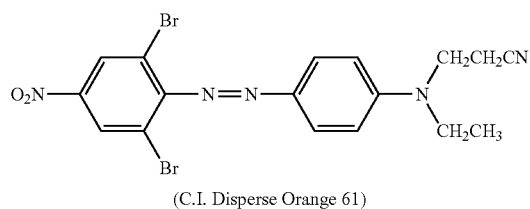

(4-3)

(C.I. Disperse Orange 61)

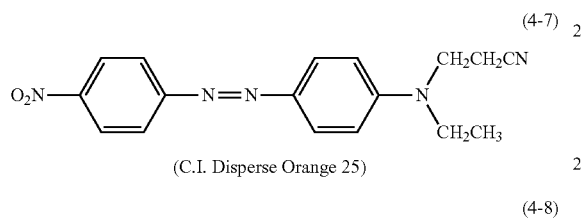

(4-7)

(C.I. Disperse Orange 25)

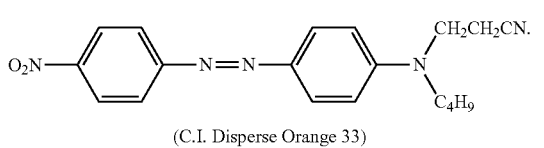

(4-8)

(C.I. Disperse Orange 33)

The disperse dye composition according to the present disclosure, preferably, said Component E consists of one or two or more of the following compounds:

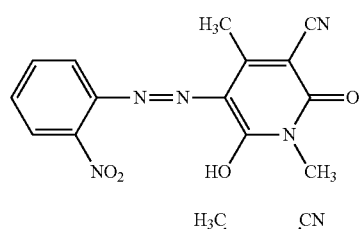

(5-1)

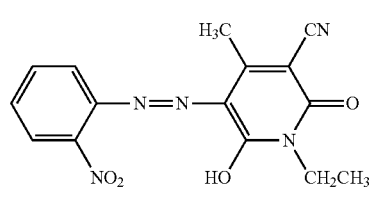

(5-2)

(C.I. Disperse Yellow 119)

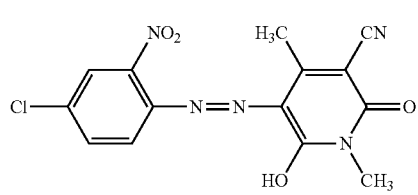

(5-3)

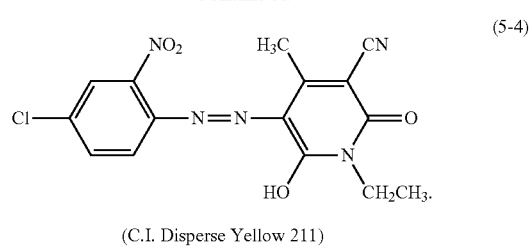

(5-4)

(C.I. Disperse Yellow 211)

The disperse dye composition according to the present disclosure, preferably, said Component F consists of one or two or more of the following compounds:

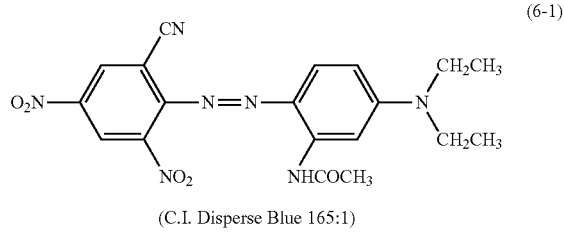

(6-1)

(C.I. Disperse Blue 165:1)

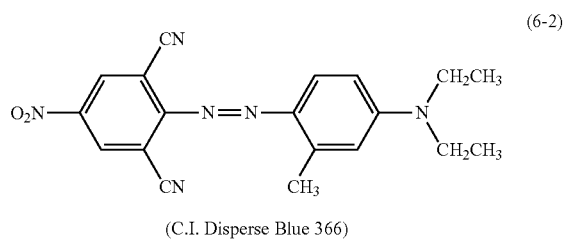

(6-2)

(C.I. Disperse Blue 366)

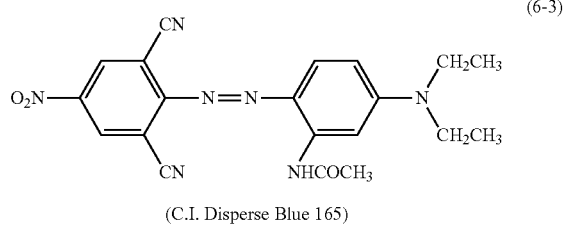

(6-3)

(C.I. Disperse Blue 165)

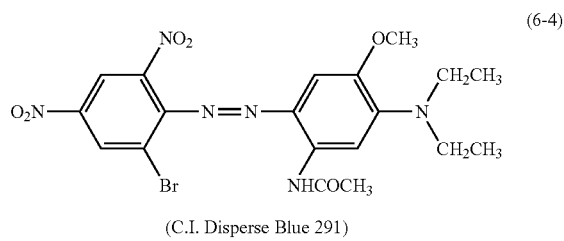

(6-4)

(C.I. Disperse Blue 291)

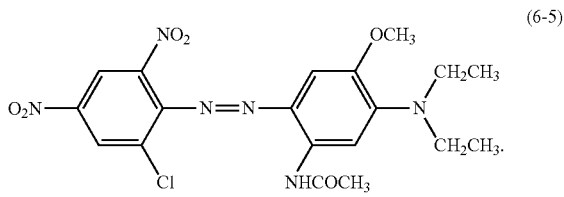

(6-5)

The disperse dye composition according to the present disclosure, preferably, said Component F consists of one or two or more of the following compounds:

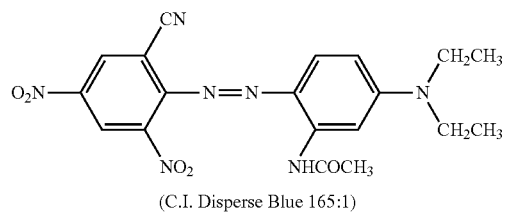

(C.I. Disperse Blue 165:1)    (6-1)

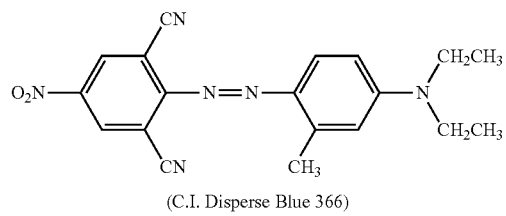

(C.I. Disperse Blue 366)    (6-2)

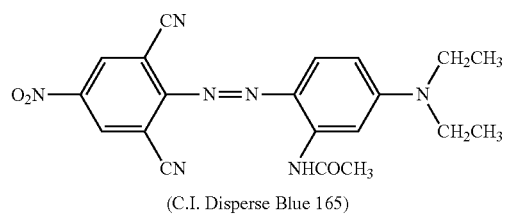

(C.I. Disperse Blue 165)    (6-3)

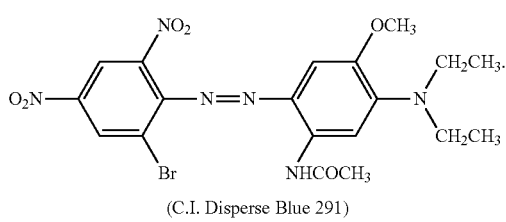

(C.I. Disperse Blue 291)    (6-4)

The disperse dye composition according to the present disclosure, preferably, said Component F consists of one or two or more of the following compounds:

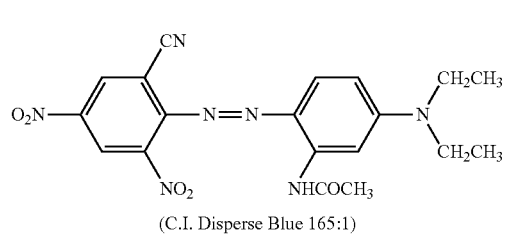

(C.I. Disperse Blue 165:1)    (6-1)

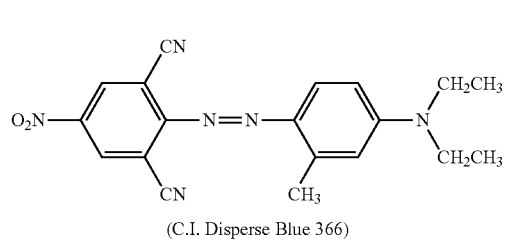

(C.I. Disperse Blue 366)    (6-2)

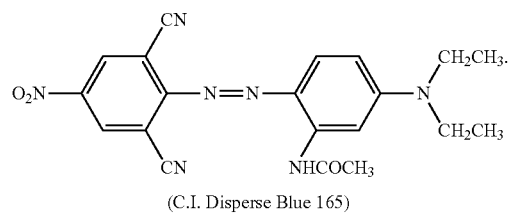

(C.I. Disperse Blue 165)    (6-3)

The disperse dye composition according to the present disclosure, preferably, Component B consists of one or two compounds as represented by formula (2-1) and formula (2-2):

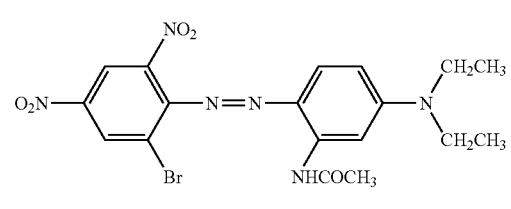

(C.I. Disperse Violet 93)    (2-1)

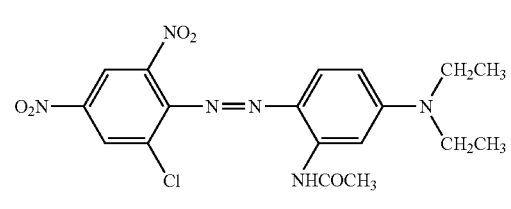

(C.I. Disperse Violet 93:1)    (2-2)

Component C consists of one or two or more of the compounds as represented by formulae (3-1) to (3-4):

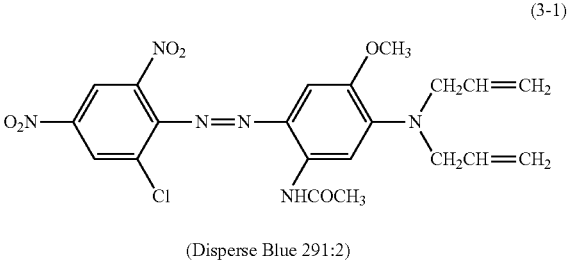

(Disperse Blue 291:2)    (3-1)

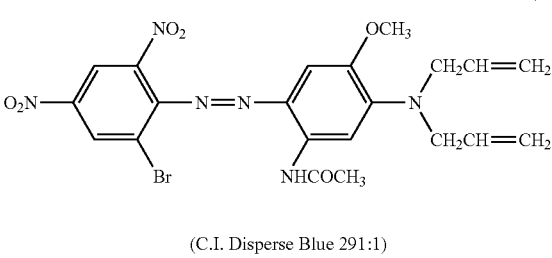

(C.I. Disperse Blue 291:1)    (3-2)

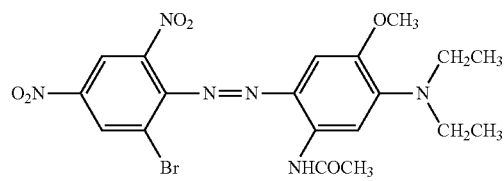

(C.I. Disperse Blue 291)

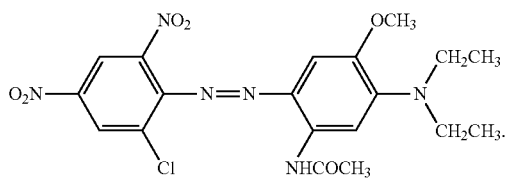

The disperse dye composition according to the present disclosure, preferably, Component B consists of one or two compounds as represented by formula (2-1) and formula (2-2):

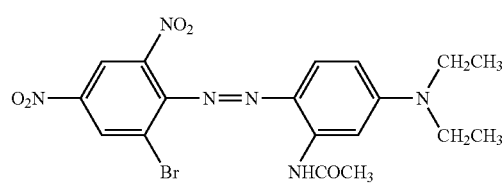

(C.I. Disperse Violet 93)

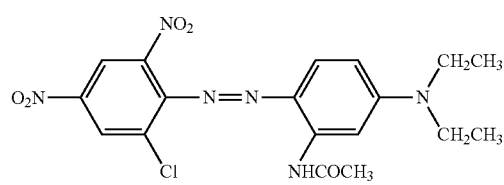

(C.I. Disperse Violet 93:1)

Component C consists of one or two compounds as represented by formulae (3-1) and (3-4):

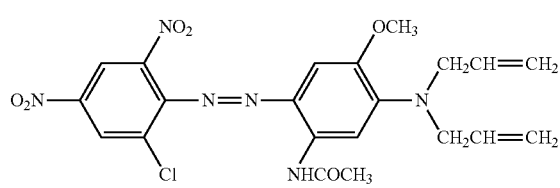

(Disperse Blue 291:2)

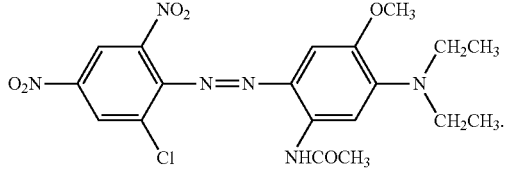

The disperse dye composition according to the present disclosure, preferably, based on the total weight of said composition, comprising:

Component A in the amount of 2~73% by weight,
Component B in the amount of 7~40% by weight,
Component C in the amount of 20~58% by weight,
Optionally, Component D in the amount of 0~70% by weight,
Optionally, Component E in the amount of 0~10% by weight,
Optionally, Component F in the amount of 0~47% by weight, and
Optionally, Component G in the amount of 0~47% by weight.

The disperse dye composition according to the present disclosure, preferably, based on the total weight of said composition,
the weight percentage of Component A is 3~50%,
the weight percentage of Component B is 12~39%,
the weight percentage of Component C is 38~58%.

The disperse dye composition according to the present disclosure, preferably, based on the total weight of said composition,
the weight percentage of Component A is 2~60%,
the weight percentage of Component B is 7~37%,
the weight percentage of Component C is 30~55%,
the weight percentage of Component D is 3~6%.

The disperse dye composition according to the present disclosure, preferably, based on the total weight of said composition,
the weight percentage of Component A is 3~6%,
the weight percentage of Component B is 12~37%,
the weight percentage of Component C is 35~55%,
the weight percentage of Component D is 2~50%.

The disperse dye composition according to the present disclosure, preferably, based on the total weight of said composition,
the weight percentage of Component A is 2~51%,
the weight percentage of Component B is 12~37%,
the weight percentage of Component C is 35~55%,
the weight percentage of Component E is 2~6%.

The disperse dye composition according to the present disclosure, preferably, based on the total weight of said composition,
the weight percentage of Component A is 2~72%,
the weight percentage of Component B is 7~40%,
the weight percentage of Component C is 20~48%,
the weight percentage of Component F is 1~10%.

The disperse dye composition according to the present disclosure, preferably, based on the total weight of said composition,
the weight percentage of Component A is 2~72%,
the weight percentage of Component B is 7~40%,
the weight percentage of Component C is 20~48%,
the weight percentage of Component G is 1~10%.

The disperse dye composition according to the present disclosure, preferably, based on the total weight of said composition,
the weight percentage of Component A is 2~71%,
the weight percentage of Component B is 7~40%,
the weight percentage of Component C is 20~48%,
the weight percentage of Component E is 1~5%,
the weight percentage of Component G is 1~5%.

The disperse dye composition according to the present disclosure, preferably, based on the total weight of said composition,
the weight percentage of Component A is 2~71%,
the weight percentage of Component B is 7~40%,
the weight percentage of Component C is 20~48%,
the weight percentage of Component E is 1~5%,
the weight percentage of Component F is 1~5%.

During the practical production, generally each dye component of the present disclosure may carry certain amount of by-products and other impurities, so long as the practice of the present disclosure is not affected.

The present disclosure provides a disperse dye, which contains the disperse dye composition of the present disclosure and auxiliary materials.

The disperse dye of the present disclosure, wherein the auxiliary materials comprise assistants and water.

The disperse dye of the present disclosure, wherein the assistants comprise one or a combination of two or more of the following substances: a naphthalenesulfonic acids-formaldehyde condensate, lignin sulfonate, sodium sulphate, a surfactant, a bactericide or other dispersion agents for dyes.

The disperse dye of the present disclosure, wherein the weight ratio of the assistants to the disperse dye composition is 0.3~4:1.

The disperse dye of the present disclosure, wherein the disperse dyes present as liquid with a solid content of 20~50% after ground by a sand mill or a grinder; or the disperse dyes present as powder or particles with a solid content of 87~96% after spray drying.

Further provided is a method for preparing the disperse dyes of the present disclosure, comprising the following steps:
mixing all the dye components, followed by a treatment of grinding the dye components into particles with a sand mill or a grinder in the presence of auxiliary materials; or
subjecting each of the dye components separately to a treatment of grinding the components into particles with a sand mill or a grinder in the presence of auxiliary materials, then mixing the components.

Further provided is a use of the disperse dye of the present disclosure in dyeing and printing of fabrics.

Further provided is a fabric, which is obtained through a dyeing and printing process using the disperse dyes of the present disclosure.

Advantageous Effects

The disperse dye of the present disclosure has superior fastness to sunlight, broad range of applicable pH, excellent compatibility between all the components, high strength, low cost in printing and dyeing, and excellent fastness to washing; if the compounds of general formulae (2), (3), (4), (6) are free of chlorine but only contain bromine, the disperse dye of the present disclosure meets the requirement of Grade 1 in Oeko-Tex Standard 100 (2013).

DESCRIPTION OF THE EMBODIMENTS

The disperse dye composition according to the present disclosure, based on the total weight of said composition, comprising:

Component A in the amount of 2~73% by weight, preferably 2~72%, more preferably 2~71%, more preferably 2~60%, more preferably 2~51%, more preferably 3~50%, more preferably 3~6%;

Component B in the amount of 7~40% by weight, preferably 7~37% or 12~39%, more preferably 12~37%;

Component C in the amount of 20~58% by weight, preferably 30~55% or 20~48%, more preferably 38~58% or 35~55%;

optionally, Component D in the amount of 0~70% by weight, preferably 2~50%, more preferably 3~6%;

optionally, Component E in the amount of 0~10% by weight, preferably 2~6%, more preferably 1~5%;

optionally, Component F in the amount of 0~47% by weight, preferably 1~10%, more preferably 1~5%;

and optionally, Component G in the amount of 0~47% by weight, preferably 1~10%, more preferably 1~5%.

The disperse dye composition according to the present disclosure, in the condition that Component C consists of compounds as represented by formula (3-1) and formula (3-2), the weight percentage of the compound represented by formula (3-1) is 1~99%, preferably 70~90%, the weight percentage of the compound represented by formula (3-2) is 1~99%, preferably 10~30%.

EXAMPLES

The present disclosure will be further illustrated in accordance with the following examples; however, the protection scope of the present disclosure is not limited within the examples.

In the examples, components A, B, C and the optional components D, E, F, G were blended with assistants and water in a certain compounding ratio. The mixture was ground and dispersed with a sand mill to produce slurry, or further subjected to spray drying, therefore the dye samples were prepared.

All the components A, B, C, D, E, F, and G are dye compounds known in the ails, and are commercially available or can be prepared according to prior art methods.

Example 1

Into 15.6 g of dye component of formula (1), 6.1 g of dye component of formula (2-2), 16.3 g of dye component of formula (3-1), 31 g of dispersant MF, and 31 g of lignin 85 A, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 1

The same procedure in Example 1 was repeated except that the dye component of formula (1) in Example 1 was replaced by the dye component of the following formula (8):

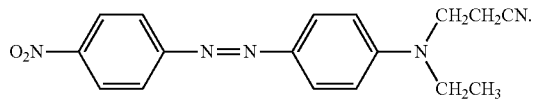

(8)

The finished dye products in Example 1 and Comparative Example 1 were subjected to performance test.

The detailed test procedures are as follows:

In accordance with the method similar with that described in GB/T2394-2003, the finished dye products of Example 1 and Comparative Example 1 were weighed in an amount of 0.5 g. and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength of the cloth samples was determined according to GB/T6688-2008. The results are shown in Table 1.

TABLE 1

| Sample name | Strength |
|---|---|
| Example 1 | 102% |
| Comparative Example 1 | 100% |

Higher strength means that, during printing and dyeing, a lower amount of dye is required for dyeing the fabrics to a certain color depth. Therefore the cost of printing and dyeing is reduced.

Example 2

Into 15.6 g of dye component of formula (1), 6.1 g of dye component of formula (2-1), 16.3 g of dye component of formula (3-2), 31 g of dispersant MF, and 31 g of lignin 85 A, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 2

The same procedure in Example 2 was repeated except that the dye component of formula (1) in Example 2 was replaced by the dye component of the following formula (9):

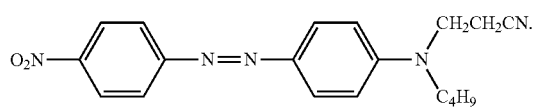

(9)

The finished dye products in Example 2 and Comparative Example 2 were subjected to performance test.

The detailed test procedures are as follows:

In accordance with the method similar with that described in GB/T2394-2003, the finished dye products of Example 2 and Comparative Example 2 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight of the samples was determined with AATCC16-2004. The results are shown in Table 2.

TABLE 2

| Sample name | Fastness to sunlight (40 h) |
|---|---|
| Example 2 | 2~3 |
| Comparative Example 2 | 2 |

Example 3

Into 15.6 g of dye component of formula (1), 6.1 g of dye component of formula (2-2), 11.4 g of dye component of formula (3-1), 4.9 g of dye component of formula (3-2) and 11.4 g of dispersant MF, 100 g of water were added. The mixture was stirred till well homogenized, ground and dispersed to obtain the liquid finished dye product. The finished dye product was used in the dyeing process to produce black polyester fabrics with excellent fastness properties.

Comparative Example 3

The same procedure in Example 3 was repeated except that the dye component of formula (1) in Example 3 was replaced by the dye component of formula (4-1):

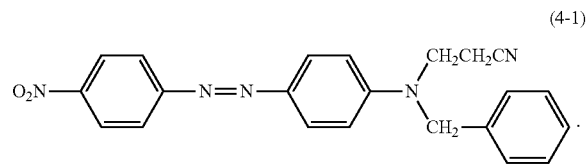

(4-1)

The finished dye products in Example 3 and Comparative Example 3 were subjected to performance test.

The detailed test procedures are as follows:

In accordance with the method similar with that described in GB/T2394-2003, the finished dye products of Example 3 and Comparative Example 3 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength, fastness to sunlight and compatibility of the samples were determined using GB/T6688-2008 and AATCC16-2004, with reference to GB/T2400-2006. The results are shown in Table 3.

TABLE 3

| Sample name | Strength | Fastness to sunlight | Compatibility |
| --- | --- | --- | --- |
| Example 3 | 105% | 3 | II |
| Comparative Example 3 | 100% | 2 | III |

Method for determining compatibility: the dyeing process was performed in accordance with GB/T2394-2003. The fabrics were put into dyeing at 60° C. A sample was collected once the temperature was increased to 80° C., then the samples were collected with a temperature interval of 10° C. till 130° C. The samples were also collected when the temperature was kept at 130° C. for 10 min, 20 min, 30 min and 50 min, respectively. Totally 10 cloth samples were collected. The sample collected when the temperature was kept at 130° C. for 50 min was used as standard sample. The test samples, i.e. the samples collected at each temperature levels, were checked to determine whether the hue change was synchronized. The results were classified into five grades: I, II, III, IV and V (instrument: datacolor 600 color photometer, colour difference formula CMC 2:1). For black color, the number of the cloth samples that both the DC (brilliance contrast) and the DH (hue difference) of which are less than 0.6 was counted.

Grade I: Five cloth samples or more
Grade II: Four cloth samples
Grade III: Three cloth samples
Grade IV: Two cloth samples
Grade V: One cloth sample

Example 4

Into 15.6 g of dye component of formula (1), 6.1 g of dye component of formula (2-1), 16.4 g of dye component of formula (3-4), 31 g of dispersant MF, and 31 g of diffusant NNO, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 4

The same procedure in Example 4 was repeated except that the dye component of formula (1) in Example 4 was replaced by the dye component of the following formula (10):

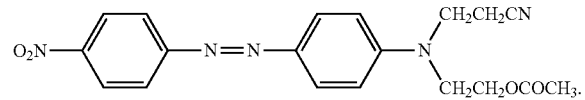

(10)

The finished dye products in Example 4 and Comparative Example 4 were subjected to performance test.

The detailed test procedures are as follows:

In accordance with the method similar with that described in GB/T2394-2003, the finished dye products of Example 4 and Comparative Example 4 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the stability range of pH value of the samples were determined using GB/T6688-2008, with reference to GB/T2403-2006. The results are shown in Table 4.

TABLE 4

| Sample name | Strength | stability range of pH value |
| --- | --- | --- |
| Example 4 | 107% | 3~9 |
| Comparative Example 4 | 100% | 3~7 |

Note:
stability range of pH value: The pH value range that strength ≥ 95% was taken as the stability range of pH value.

Example 5

Into 44 g of dye component of formula (1), 22 g of dye component of formula (2-2), 34 g of dye component of formula (3-1), 31 g of dispersant MF, and 31 g of diffusant NNO, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 5

The same procedure in Example 5 was repeated except that 44 g of the dye component of formula (1) in Example 5 was replaced by 41.4 g of the dye component of formula (10) and 2.6 g of the dye component of formula (11):

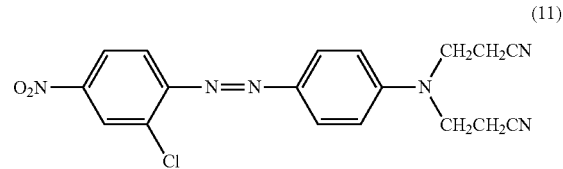

(11)

The finished dye products in Example 5 and Comparative Example 5 were subjected to performance test.

The detailed test procedures are as follows:

In accordance with the method similar with that described in GB/T2394-2003, the finished dye products of Example 5 and Comparative Example 5 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the stability range of pH value of the samples were determined using GB/T6688-2008, with reference to GB/T2403-2006. The results are shown in Table 5.

TABLE 5

| Sample name | Strength | stability range of pH value |
|---|---|---|
| Example 5 | 107% | 3~9 |
| Comparative Example 5 | 100% | 3~7 |

Note:
stability range of pH value: The pH value range that strength ≥ 95% was taken as the stability range of pH value.

Example 6

Into 7.8 g of dye component of formula (1), 7.8 g of dye component of formula (4-1), 6.1 g of dye component of formula (2-1), 16.4 g of dye component of formula (3-4), 31 g of dispersant MF, and 31 g of lignin 85 A, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 6

The same procedure in Example 6 was repeated except that the dye component of formula (1) in Example 6 was replaced by the dye component of formula (8):

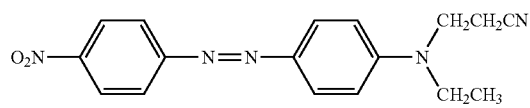

(8)

The finished dye products in Example 6 and Comparative Example 6 were subjected to performance test.
The detailed test procedures are as follows:
In accordance with the method similar with that described in GB/T2394-2003, the finished dye products of Example 6 and Comparative Example 6 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength of the samples was determined using GB/T6688-2008. The results are shown in Table 6.

TABLE 6

| Sample name | Strength |
|---|---|
| Example 6 | 102% |
| Comparative example 6 | 100% |

Examples 7 and 8

According to the formulation shown in Table 7, the finished dye products were prepared in the same manner as described in Example 6.

TABLE 7

| | Component A | | Component B | | Component C | | Assistant | | Unit: g Water |
|---|---|---|---|---|---|---|---|---|---|
| Example | Formula | Weight | Formula | Weight | Formula | Weight | Brand name | Weight | Weight |
| 7 | (1) | 2 | (2-1) | 40 | (3-3) | 58 | Dispersant M1 | 30 | 520 |
| 8 | (1) | 1.5 | (2-1) | 6 | (3-3) | 4 | Dispersant M1 | 10 | 70 |
| | | | | | (3-2) | 5 | Glauber salt | 3.5 | |

The finished dye products in Example 7 and Example 8 were subjected to performance test.
The detailed test procedures are as follows:
In accordance with the method similar with that described in GB/T2394-2003, the finished dye products of Example 7 and Example 8 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the compatibility of the samples was determined using the method described in Example 3. The results are shown in Table 8.

TABLE 8

| Example | Compatibility |
|---|---|
| 7 | II |
| 8 | II |

Example 9

According to the formulation shown in Table 9, the finished dye product was prepared in the same manner as described in Example 6.

TABLE 9

| Example | Component A Formula | Component A Weight | Component B Formula | Component B Weight | Component C Formula | Component C Weight | Assistant Brand name | Assistant Weight | Unit: g Water Weight |
|---|---|---|---|---|---|---|---|---|---|
| 9 | (1) | 73 | (2-2) | 7 | (3-4) | 20 | Diffusant CMF | 100 | 200 |

The finished dye product in Example 9 was subjected to performance test.

The detailed test procedures are as follows:

In accordance with the method similar with that described in GB/T2394-2003, the finished dye product of Example 9 was weighed in an amount of 0.5 g, and added into 250 ml of water to prepare disperse dye suspensions. 10 ml of suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight of the samples was determined using the AATCC16-2004 method. The results are shown in Table 10.

TABLE 10

| Example | Fastness to sunlight |
|---|---|
| 9 | 3 |

Examples 10-15

According to the formulation shown in Table 11, the finished dye product were prepared in the same manner as described in Example 6.

TABLE 11

| Example | Component A Formula | Component A Weight | Component B Formula | Component B Weight | Component C Formula | Component C Weight | Assistant Brand name | Assistant Weight | Unit: g Water Weight |
|---|---|---|---|---|---|---|---|---|---|
| 10 | (1) | 6.8 | (2-1) | 2.6 | (3-2) | 7.1 | Diffusant CMF<br>Glauber salt | 65.5<br>5 | 13 |
| 11 | (1) | 27.5 | (2-2) | 10.7 | (3-1) | 28.7 | Lignin 85A | 29.1 | 4 |
| 12 | (1) | 4 | (2-2) | 15.2 | (3-1)<br>(3-2) | 15.8<br>6.7 | Lignin 83A | 50.3 | 8 |
| 13 | (1) | 6.4 | (2-2) | 24.3 | (3-4)<br>(3-1) | 20<br>16.1 | Diffusant NNO<br>Lignin 85A | 200<br>67.5 | 37 |
| 14 | (1) | 3 | (2-2) | 39 | (3-1) | 58 | Dispersant MF | 150 | 21.5 |
| 15 | (1) | 50 | (2-2) | 12 | (3-1) | 38 | Diffusant NNO | 200 | 33 |

The finished dye products in Examples 10-15 were subjected to performance test.

The detailed test procedures are as follows:

In accordance with the method similar with that described in GB/T2394-2003, the finished dye products of Examples 10-15 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, the fastness to sunlight and the compatibility of the samples was determined using AATCC16-2004 and the method described in Example 3. The results are shown in Table 12.

TABLE 12

| Example | Fastness to sunlight | Compatibility |
|---|---|---|
| 10 | 2~3 | II |
| 11 | 2~3 | II |
| 12 | 2~3 | II |
| 13 | 2~3 | II |
| 14 | 2~3 | II |
| 15 | 3 | II |

Examples 16-17

According to the formulation shown in Table 13, and the finished dye product were prepared.

TABLE 13

Unit: g

| Example | Component A Formula | Weight | Component B Formula | Weight | Component C Formula | Weight | Component D Formula | Weight | Component E Formula | Weight | Component F Formula | Weight |
|---|---|---|---|---|---|---|---|---|---|---|---|---|
| 16 | (1) | 3 | (2-1) | 7 | (3-3) | 20 | (4-1) | 70 | — | 0 | — | 0 |
| 17 | (1) | 13 | (2-2) | 13 | (3-4) | 34 | (4-2) | 40 | — | 0 | — | 0 |

The finished dye products in Examples 16-17 were subjected to performance test.

The detailed test procedures are as follows:

In accordance with the method similar with that described in GB/T2394-2003, the finished dye products of Examples 16-17 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 601° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the compatibility of the samples was determined using the method described in Example 3. The results are shown in Table 14.

TABLE 14

| Example | Compatibility |
|---|---|
| 16 | II |
| 17 | I |

Examples 18-38

According to the formulation shown in Table 15, and the finished dye product were prepared.

TABLE 15

Unit: g

| Example | Component A Formula | Weight | Component B Formula | Weight | Component C Formula | Weight | Component D Formula | Weight | Component E Formula | Weight | Component F Formula | Weight |
|---|---|---|---|---|---|---|---|---|---|---|---|---|
| 18 | (1) | 24.5 | (2-1) | 15 | (3-2) | 30.5 | (4-3) | 30 | — | 0 | — | 0 |
| 19 | (1) | 37 | (2-2) | 15 | (3-1) | 28 | (4-4) | 20 | — | 0 | — | 0 |
| 20 | (1) | 56 | (2-2) | 12 | (3-1) (3-2) | 15.4 6.6 | (4-5) | 10 | — | 0 | — | 0 |
| 21 | (1) | 38 | (2-2) | 16 | (3-4) (3-1) (3-2) | 30 10 4 | (4-6) | 2 | — | 0 | — | 0 |
| 22 | (1) | 38 | (2-2) | 16 | (3-4) (3-1) (3-2) | 30 10 4 | (4-7) | 2 | — | 0 | — | 0 |
| 23 | (1) | 38 | (2-2) | 16 | (3-4) (3-1) (3-2) | 30 10 4 | (4-8) | 2 | — | 0 | — | 0 |
| 24 | (1) | 2 | (2-2) | 37 | (3-1) | 55 | (4-1) | 6 | — | 0 | — | 0 |
| 25 | (1) | 60 | (2-2) | 7 | (3-4) | 30 | (4-2) | 3 | — | 0 | — | 0 |
| 26 | (1) | 6 | (2-2) | 37 | (3-4) | 55 | (4-3) | 2 | — | 0 | — | 0 |
| 27 | (1) | 3 | (2-2) | 12 | (3-1) | 35 | (4-4) | 50 | — | 0 | — | 0 |
| 28 | (1) | 60 | (2-2) | 10 | (3-4) | 28 | — | 0 | (5-1) | 2 | — | 0 |
| 29 | (1) | 55 | (2-2) | 10 | (3-4) (3-1) (3-2) | 11 14 6 | — | 0 | (5-2) | 6 | — | 0 |
| 30 | (1) | 40 | (2-2) | 9 | (3-1) | 43 | — | 0 | (5-3) | 8 | — | 0 |
| 31 | (1) | 58 | (2-2) | 12 | (3-1) (3-2) | 14 6 | — | 0 | (5-4) | 10 | — | 0 |
| 32 | (1) | 51 | (2-2) | 12 | (3-1) | 35 | — | 0 | (5-1) | 2 | — | 0 |
| 33 | (1) | 2 | (2-1) | 37 | (3-2) | 55 | — | 0 | (5-2) | 6 | — | 0 |
| 34 | (1) | 10 | (2-1) | 23 | (3-4) | 20 | — | 0 | — | 0 | (6-1) | 47 |
| 35 | (1) | 41 | (2-2) | 9 | (3-3) | 20 | — | 0 | — | 0 | (6-2) | 30 |
| 36 | (1) | 13 | (2-2) | 37 | (3-1) | 40 | — | 0 | — | 0 | (6-3) | 10 |
| 37 | (1) | 2 | (2-2) | 40 | (3-1) | 48 | — | 0 | — | 0 | (6-1) | 10 |
| 38 | (1) | 72 | (2-2) | 7 | (3-4) | 20 | — | 0 | — | 0 | (6-2) | 1 |

The finished dye products in Examples 18-38 were subjected to performance test.

The detailed test procedures are as follows:

In accordance with the method similar with that described in GB/T2394-2003, the finished dye products of Examples 18-38 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to S with acetic acid, then the temperature was increased to 60° C. At the same time, 2 g of polyester fiber was added into the bath, and stained under high temperature and high pressure. The temperature was gradually increased to 130° C. within 35 min, kept for 45 min, then cooled down to 80° C., and the samples were collected.

The shade of the cloth samples was observed, the fastness to sunlight and the compatibility of the samples was determined using AATCC16-2004 and the method described in Example 3. The results are shown in Table 16.

TABLE 16

| Example | Fastness to sunlight | Compatibility |
|---------|----------------------|---------------|
| 18 | 2~3 | I |
| 19 | 2~3 | I |
| 20 | 3 | II |
| 21 | 3 | I |
| 22 | 3 | I |
| 23 | 3 | I |
| 24 | 2~3 | I |
| 25 | 3 | I |
| 26 | 2~3 | I |
| 27 | 2~3 | I |
| 28 | 3 | II |
| 29 | 3 | II |
| 30 | 2~3 | II |
| 31 | 3 | II |
| 32 | 3 | I |
| 33 | 2~3 | I |
| 34 | 2~3 | II |
| 35 | 2~3 | II |
| 36 | 3 | I |
| 37 | 3 | I |
| 38 | 3 | I |

Examples 39-43

According to the formulation shown in Table 17, and the Finished dye product were prepared.

TABLE 17

Unit: g

| | Component A | | Component B | | Component C | | Component D | |
|---------|---------|--------|---------|--------|---------|--------|---------|--------|
| Example | Formula | Weight | Formula | Weight | Formula | Weight | Formula | Weight |
| 39 | (1) | 8 | (2-1) | 25 | (3-3) | 20 | (7) | 47 |
| 40 | (1) | 41 | (2-2) | 16 | (3-4) | 33 | (7) | 10 |
| 41 | (1) | 14 | (2-2) | 36 | (3-4) | 25 | (7) | 25 |
| 42 | (1) | 72 | (2-2) | 7 | (3-1) | 20 | (7) | 1 |
| 43 | (1) | 2 | (2-2) | 40 | (3-1) | 48 | (7) | 10 |

The finished dye products in Examples 39-43 were subjected to performance test.

The detailed test procedures are as follows:

In accordance with the method similar with that described in GB/T2394-2003, the finished dye products of Examples 39-43 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, the fastness to sunlight and the compatibility of the samples was determined using AATCC16-2004 and the method described in Example 3. The results are shown in Table 18.

TABLE 18

| Example | Fastness to sunlight | Compatibility |
|---------|----------------------|---------------|
| 39 | 2~3 | II |
| 40 | 3 | II |
| 41 | 2~3 | II |
| 42 | 3 | II |
| 43 | 3 | II |

Example 44

Into 41 g of dye component of formula (1), 16 g of dye component of formula (2-2), 43 g of dye component of formula (3-1), 80 g of dispersant MF, and 80 g of lignin 85 A, 390 g of water were added. The mixture was stirred till well homogenized, ground, dispersed and dried to obtain the finished dye product. The finished dye product was used in the dyeing process to produce black polyester fabrics with excellent fastness properties.

Comparative Example 44

The same procedure in Example 44 was repeated except that the dye component of formula (1) in Example 44 was replaced by the dye component of the following formula (8):

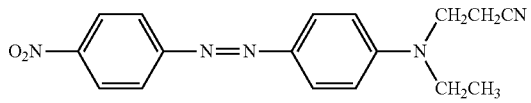

(8)

The finished dye products in Example 44 and Comparative Example 44 were subjected to performance test.

The detailed test procedures are as follows:

In accordance with the method similar with that described in GB/T2394-2003, the finished dye products of Example 44 and Comparative Example 44 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength of the samples was determined using GB/T6688-2008. The results are shown in Table 19.

TABLE 19

| Sample name | Strength |
|---|---|
| Example 44 | 102% |
| Comparative Example 44 | 100% |

Higher strength means that, during printing and dyeing, a lower amount of dye is required for dyeing the fabrics to a certain color depth. Therefore the cost of printing and dyeing is reduced.

Example 45

Into 41 g of dye component of formula (1), 16 g of dye component of formula (2-2), 43 g of dye component of formula (3-1), 80 g of dispersant MF, and 80 g of lignin 85 A, 390 g of water were added. The mixture was stirred till well homogenized, ground, dispersed and dried to obtain the finished dye product. The finished dye product was used in the dyeing process to produce black polyester fabrics with excellent fastness properties.

Comparative Example 45

The same procedure in Example 45 was repeated except that the dye component of formula (1) in Example 45 was replaced by the dye component of the following formula (9):

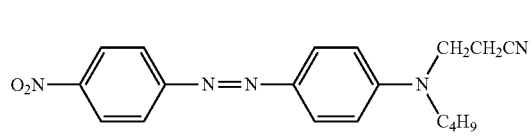

(9)

The finished dye products in Example 45 and Comparative Example 45 were subjected to performance test.

The detailed test procedures are as follows:

In accordance with the method similar with that described in GB/T2394-2003, the finished dye products of Example 45 and Comparative Example 45 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight of the samples was determined using AATCC16-2004. The results are shown in Table 20.

Example 46

TABLE 20

| Sample name | Fastness to sunlight (40 h) |
|---|---|
| Example 45 | 3 |
| Comparative Example 45 | 2~3 |

Into 41 g of dye component of formula (1), 16 g of dye component of formula (2-2), 43 g of dye component of formula (3-1) and 30 g of dispersant MF, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 46

The same procedure in Example 46 was repeated except that the dye component of formula (1) in Example 46 was replaced by the dye component of formula (4-1):

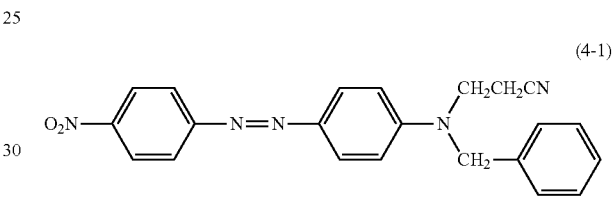

(4-1)

The finished dye products in Example 46 and Comparative Example 46 were subjected to performance test.

The detailed test procedures are as follows:

In accordance with the method similar with that described in GB/T2394-2003, the finished dye products of Example 46 and Comparative Example 46 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength, the fastness to sunlight and the compatibility of the samples were determined using GB/T6688-2008 and AATCC16-2004, with reference to GB/T2400-2006. The results are shown in Table 21.

TABLE 21

| Sample name | Strength | Fastness to sunlight | Compatibility |
|---|---|---|---|
| Example 46 | 105% | 3 | II |
| Comparative Example 46 | 100% | 2 | III |

Method for determining compatibility: the dyeing process was performed in accordance with GB/T2394-2003. The fabrics were put into dyeing at 60° C. A sample was collected once the temperature was increased to 80° C., then the samples were collected with a temperature interval of 10° C. till 130° C. The samples were also collected when the temperature was kept at 130° C. for 10 min, 20 min, 30 min and 50 min, respectively. Totally 10 cloth samples were collected. The sample collected when the temperature was kept at 130° C. for 50 min was used as standard sample. The test samples, i.e. the samples collected at each temperature levels, were checked to determine whether the hue change was synchronized. The results were classified into five grades: I, II, III, IV and V (instrument: datacolor 600 color photometer, colour difference formula CMC 2:1). For black color, the number of the cloth samples that both the DC (brilliance contrast) and the DH (hue difference) of which are less than 0.6 was counted.
Grade I: Five cloth samples or more
Grade II: Four cloth samples
Grade III: Three cloth samples
Grade IV: Two cloth samples
Grade V: One cloth sample Example 47

Into 41 g of dye component of formula (1), 16 g of dye component of formula (2-2), 43 g of dye component of formula (3-1), 30 g of dispersant MF and 30 g of diffusant NNO, 250 g of water were added. The mixture was stirred till well homogenized, ground, dispersed and dried to obtain the finished dye product. The finished dye product was used in the dyeing process to produce black polyester fabrics with excellent fastness properties.

Comparative Example 47

The same procedure in Example 47 was repeated except that the dye component of formula (1) in Example 47 was replaced by the dye component of the following formula (10):

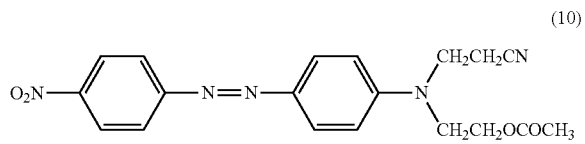

(10)

The finished dye products in Example 47 and Comparative Example 47 were subjected to performance test.
The detailed test procedures are as follows:
In accordance with the method similar with that described in GB/T2394-2003, the finished dye products of Example 47 and Comparative Example 47 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.
The shade of the cloth samples was observed, and the strength and the stability range of pH value of the samples were determined using GB/T6688-2008, with reference to GB/T2403-2006. The results are shown in Table 22.

TABLE 22

| Sample name | Strength | stability range of pH value |
|---|---|---|
| Example 47 | 107% | 3~8 |
| Comparative Example 47 | 100% | 3~6 |

Note:
stability range of pH value: The pH value range that strength ≥ 95% was taken as the stability range of pH value.

Example 48

Into 44 g of dye component of formula (1), 22 g of dye component of formula (2-2), 34 g of dye component of formula (3-1), 31 g of dispersant MF and 31 g of diffusant NNO, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 48

The same procedure in Example 48 was repeated except that 44 g of the dye component of formula (1) in Example 48 was replaced by 41.4 g of the dye component of formula (10) and 2.6 g of the dye component of formula (11):

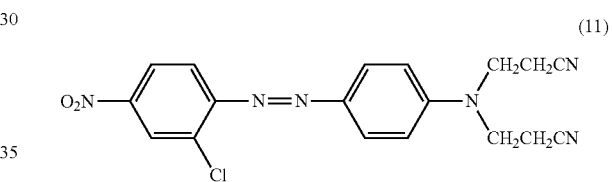

(11)

The finished dye products in Example 48 and Comparative Example 48 were subjected to performance test.
The detailed test procedures are as follows:
In accordance with the method similar with that described in GB/T2394-2003, the finished dye products of Example 48 and Comparative Example 48 were weighed in an amount of 0.5 g. and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.
The shade of the cloth samples was observed, and the strength and the stability range of pH value of the samples were determined using GB/T6688-2008, with reference to GB/T2403-2006. The results are shown in Table 23.

TABLE 23

| Sample name | Strength | stability range of pH value |
|---|---|---|
| Example 48 | 107% | 3~9 |
| Comparative Example 48 | 100% | 3~7 |

Note:
stability range of pH value: The pH value range that strength ≥ 95% was taken as the stability range of pH value.

Example 49

Into 7.8 g of dye component of formula (1), 7.8 g of dye component of formula (4-1), 6.1 g of dye component of formula (2-1), 16.4 g of dye component of formula (3-1), 31 g of dispersant MF and 31 g of lignin 85 A, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 49

The same procedure in Example 49 was repeated except that the dye component of formula (1) in Example 49 was replaced by the dye component of formula (8):

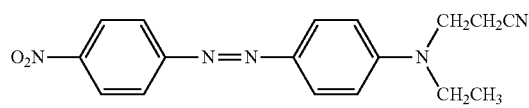

(8)

The finished dye products in Example 49 and Comparative Example 49 were subjected to performance test.

The detailed test procedures are as follows:

In accordance with the method similar with that described in GB/T2394-2003, the finished dye products of Example 49 and Comparative Example 49 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength of the samples was determined using GB/T6688-2008. The results are shown in Table 24.

TABLE 24

| Sample name | Strength |
| --- | --- |
| Example 49 | 102% |
| Comparative Example 49 | 100% |

Example 50

Into 9.5 g of dye component of formula (1), 36.5 g of dye component of formula (2-2), 54 g of dye component of formula (3-1), 80 g of dispersant MF and 80 g of lignin 85 A, 390 g of water were added. The mixture was stirred till well homogenized, ground, dispersed and dried to obtain the finished dye product.

The finished dye product was used in the dyeing process to produce blue polyester fabrics with excellent fastness properties.

Comparative Example 50

The same procedure in Example 50 was repeated except that the dye component of formula (3-1) in Example 50 was replaced by the dye component of the following formula (12):

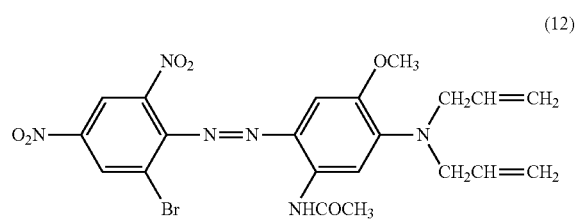

(12)

The finished dye products in Example 50 and Comparative Example 50 were subjected to performance test.

The detailed test procedures are as follows:

In accordance with the method similar with that described in GB/T2394-2003, the finished dye products of Example 50 and Comparative Example 50 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the fastness to sunlight of the samples were determined using GB/T6688-2008 and AATCC16-2004. The results are shown in Table 25.

TABLE 25

| Sample name | Strength | Fastness to sunlight (40 h) |
| --- | --- | --- |
| Example 50 | 105% | 3 |
| Comparative Example 50 | 100% | 2~3 |

Example 51

Into 12 g of dye component of formula (1), 34 g of dye component of formula (2-2), 54 g of dye component of formula (3-1), 80 g of dispersant MF and 80 g of lignin 85 A, 390 g of water were added. The mixture was stirred till well homogenized, ground, dispersed and dried to obtain the finished dye product. The finished dye product was used in the dyeing process to produce blue polyester fabrics with excellent fastness properties.

Comparative Example 51

The same procedure in Example 51 was repeated except that 54 g of the dye component of formula (3-1) in Example 51 was replaced by 27 g of the dye component of formula (12) and 27 g of the dye component of formula (3-1).

The finished dye products in Example 51 and Comparative Example 51 were subjected to performance test.

The detailed rest procedures are as follows:

In accordance with the method similar with that described in GB/T2394-2003, the finished dye products of Example 51 and Comparative Example 51 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the fastness to sunlight of the samples were determined using GB/T6688-2008 and AATCC16-2004. The results are shown in Table 26.

TABLE 26

| Sample name | Strength | Fastness to sunlight (40 h) |
|---|---|---|
| Example 51 | 103% | 3 |
| Comparative Example 51 | 100% | 2~3 |

Examples 52 and 53

According to the formulation shown in Table 27, the finished dye product were prepared in the same manner as described in Example 51.

TABLE 27

| | Component A | | Component B | | Component C | | Assistant | | Unit: g Water |
|---|---|---|---|---|---|---|---|---|---|
| Example | Formula | Weight | Formula | Weight | Formula | Weight | Brand name | Weight | Weight |
| 52 | (1) | 2 | (2-1) | 40 | (3-1) | 58 | Dispersant MF | 30 | 520 |
| 53 | (1) | 3 | (2-1) | 39 | (3-4) | 58 | Diffusant CNF | 150 | 38.8 |
| | | | | | | | Glauber salt | 10 | |

The finished dye products in Example 52 and Example 53 were subjected to performance test.

The detailed test procedures are as follows:

In accordance with the method similar with that described in GB/T2394-2003, the finished dye products of Example 52 and Example 53 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high tempera-ture and high pressure. The temperature was gradually increased to 130° C. within 35 min, kept for 45 min, then cooled down to 80° C., and the samples were collected.

The shade of the cloth samples was observed, the compatibility of the samples was determined using the method described in Example 46. The results are shown in Table 28.

TABLE 28

| Example | Compatibility |
|---|---|
| 52 | II |
| 53 | II |

Examples 54

According to the formulation shown in Table 29, the finished dye product were prepared in the same manner as described in Example 51.

TABLE 29

| | Component A | | Component B | | Component C | | Assistant | | Unit: g Water |
|---|---|---|---|---|---|---|---|---|---|
| Example | Formula | Weight | Formula | Weight | Formula | Weight | Brand name | Weight | Weight |
| 54 | (1) | 73 | (2-2) | 7 | (3-4) | 20 | Diffusant CNF | 100 | 200 |

The finished dye product in Example 54 was subjected to performance test.

The detailed test procedures are as follows:

In accordance with the method similar with that described in GB/T2394-2003, the finished dye product of Example 54 was weighed in an amount of 0.5 g, and added into 250 ml of water to prepare disperse dye suspensions. 10 ml of suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, the fastness to sunlight of the samples was determined using the AATCC16-2004 method. The results are shown in Table 30.

TABLE 30

| Example | Fastness to sunlight |
|---|---|
| 54 | 3 |

Examples 55 and 56

According to the formulation shown in Table 31, the finished dye product were prepared in the same manner as described in Example 51.

TABLE 31

| | Component A | | Component B | | Component C | | Assistant | | Unit: g Water |
|---|---|---|---|---|---|---|---|---|---|
| Example | Formula | Weight | Formula | Weight | Formula | Weight | Brand name | Weight | Weight |
| 55 | (1) | 50 | (2-2) | 12 | (3-1) | 38 | Lignin 85A | 200 | 13 |
| 56 | (1) | 9.5 | (2-2) | 36.5 | (3-4) | 26 | Dispersant MF | 400 | 43.5 |
| | | | | | (3-1) | 27 | | | |

The finished dye products in Example 55 and Example 56 were subjected to performance test.

The detailed test procedures are as follows:

In accordance with the method similar with that described in GB/T2394-2003, the finished dye products of Example 55 and Example 56 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, the fastness to sunlight and the compatibility of the samples was determined using AATCC16-2004 and the method described in Example 46. The results are shown in Table 32.

TABLE 32

| Example | Fastness to sunlight | Compatibility |
|---|---|---|
| 55 | 3 | II |
| 56 | 3 | II |

Examples 57-64

According to the formulation shown in Table 33, and the finished dye product were prepared.

The detailed test procedures are as follows:

In accordance with the method similar with that described in GB/T2394-2003, the finished dye products of Examples 57-64 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the compatibility of the samples was determined using the method described in Example 46. The results are shown in Table 34.

TABLE 34

| Example | Compatibility |
|---|---|
| 57 | I |
| 58 | I |
| 59 | I |
| 60 | II |
| 61 | II |
| 62 | II |
| 63 | II |
| 64 | II |

Examples 65 and 66

According to the formulation shown in Table 35, and the finished dye product were prepared.

TABLE 33

| | Component A | | Component B | | Component C | | Component D | | Component E | | Component F | | Component G | Unit: g |
|---|---|---|---|---|---|---|---|---|---|---|---|---|---|---|
| Example | Formula | Weight | Formula | Weight | Formula | Weight | Formula | Weight | Formula | Weight | Formula | Weight | Formula | Weight |
| 57 | (1) | 2 | (2-1) | 37 | (3-1) | 55 | (4-1) | 6 | — | 0 | — | 0 | — | |
| 58 | (1) | 3 | (2-1) | 12 | (3-1) | 35 | (4-4) | 50 | — | 0 | — | 0 | — | |
| 59 | (1) | 3 | (2-2) | 16 | (3-4) | 30 | (4-7) | 38 | — | 0 | — | 0 | — | |
| | | | | | (3-1) | 13 | | | | | | | | |
| 60 | (1) | 3 | (2-1) | 7 | (3-4) | 20 | (4-7) | 70 | — | 0 | — | 0 | — | |
| 61 | (1) | 2 | (2-1) | 31 | (3-4) | 20 | — | 0 | — | 0 | (6-2) | 47 | — | |
| 62 | (1) | 2 | (2-1) | 40 | (3-1) | 48 | — | 0 | (5-1) | 5 | — | 0 | (7) | 5 |
| 63 | (1) | 2 | (2-1) | 31 | (3-4) | 20 | — | 0 | — | 0 | — | 0 | (7) | 47 |
| 64 | (1) | 2 | (2-2) | 40 | (3-4) | 48 | — | 0 | (5-1) | 5 | (6-1) | 5 | — | |

TABLE 35

| | Component A | | Component B | | Component C | | Component D | | Component E | | Component F | | Component G | |
|---|---|---|---|---|---|---|---|---|---|---|---|---|---|---|
| Example | Formula | Weight | Formula | Weight | Formula | Weight | Formula | Weight | Formula | Weight | Formula | Weight | Formula | Weight |
| 65 | (1) | 72 | (2-2) | 7 | (3-1) | 20 | — | 0 | — | 0 | — | 0 | (7) | 1 |
| 66 | (1) | 72 | (2-1) | 7 | (3-1) | 20 | — | 0 | — | 0 | — | 0 | (7) | 1 |

Unit: g

The finished dye products in Example 65 and Example 66 were subjected to performance test.

The detailed test procedures are as follows:

In accordance with the method similar with that described in GB/T2394-2003, the finished dye products of Examples 65 and 66 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight of the samples was determined using AATCC16-2004. The results are shown in Table 36.

TABLE 36

| Example | Fastness to sunlight |
|---|---|
| 65 | 3 |
| 66 | 3 |

Examples 67-92

According to the formulation shown in Table 37, and the finished dye product were prepared.

TABLE 37

| | Component A | | Component B | | Component C | | Component D | | Component E | | Component F | | Component G | |
|---|---|---|---|---|---|---|---|---|---|---|---|---|---|---|
| Example | Formula | Weight | Formula | Weight | Formula | Weight | Formula | Weight | Formula | Weight | Formula | Weight | Formula | Weight |
| 67 | (1) | 60 | (2-2) | 7 | (3-1) | 30 | (4-2) | 3 | — | 0 | — | 0 | — | 0 |
| 68 | (1) | 38 | (2-2) | 16 | (3-4) | 43 | (4-3) | 3 | — | 0 | — | 0 | — | 0 |
| 69 | (1) | 6 | (2-2) | 37 | (3-4) | 55 | (4-5) | 2 | — | 0 | — | 0 | — | 0 |
| 70 | (1) | 38 | (2-2) | 16 | (3-1) | 43 | (4-6) | 3 | — | 0 | — | 0 | — | 0 |
| 71 | (1) | 9 | (2-2) | 36.5 | (3-4) 27 (3-1) 27 | | (4-8) | 0.5 | — | 0 | — | 0 | — | 0 |
| 72 | (1) | 2 | (2-2) | 37 | (3-4) | 55 | — | 0 | (5-1) | 6 | — | 0 | — | 0 |
| 73 | (1) | 51 | (2-1) | 12 | (3-1) | 35 | — | 0 | (5-2) | 2 | — | 0 | — | 0 |
| 74 | (1) | 8.5 | (2-2) | 36.5 | (3-4) 27 (3-1) 27 | | — | 0 | (5-3) | 1 | — | 0 | — | 0 |
| 75 | (1) | 37 | (2-2) | 16 | (3-1) | 43 | — | 0 | (5-4) | 4 | — | 0 | — | 0 |
| 76 | (1) | 60 | (2-1) | 7 | (3-4) | 23 | — | 0 | (5-1) | 10 | — | 0 | — | 0 |
| 77 | (1) | 2 | (2-2) | 40 | (3-4) | 55 | — | 0 | — | 0 | (6-1) | 3 | — | 0 |
| 78 | (1) | 72 | (2-2) | 7 | (3-1) | 20 | — | 0 | — | 0 | (6-2) | 1 | — | 0 |
| 79 | (1) | 2 | (2-2) | 40 | (3-4) 48 (3-1) | | — | 0 | — | 0 | (6-3) | 10 | — | 0 |
| 80 | (1) | 72 | (2-1) | 7 | (3-4) | 20 | — | 0 | — | 0 | (6-3) | 1 | — | 0 |
| 81 | (1) | 9.5 | (2-2) | 36.5 | (3-4) | 49 | — | 0 | — | 0 | (6-2) | 5 | — | 0 |
| 82 | (1) | 41 | (2-2) | 16 | (3-4) | 41 | — | 0 | — | 0 | (6-1) | 2 | — | 0 |
| 83 | (1) | 2 | (2-2) | 40 | (3-1) | 48 | — | 0 | — | 0 | — | 0 | (7) | 10 |
| 84 | (1) | 2 | (2-2) | 40 | (3-4) 28 (3-1) 27 | | — | 0 | — | 0 | — | 0 | (7) | 3 |
| 85 | (1) | 41 | (2-1) | 16 | (3-1) | 39 | — | 0 | — | 0 | — | 0 | (7) | 4 |
| 86 | (1) | 9.5 | (2-1) | 36.5 | (3-1) | 52 | — | 0 | — | 0 | — | 0 | (7) | 2 |
| 87 | (1) | 71 | (2-2) | 7 | (3-1) | 20 | — | 0 | (5-2) | 1 | — | 0 | (7) | 1 |
| 88 | (1) | 40 | (2-2) | 16 | (3-1) | 41 | — | 0 | (5-3) | 1 | — | 0 | (7) | 2 |
| 89 | (1) | 8.5 | (2-2) | 36.5 | (3-1) | 52 | — | 0 | (5-4) | 1 | — | 0 | (7) | 2 |
| 90 | (1) | 71 | (2-2) | 7 | (3-4) | 20 | — | 0 | (5-2) | 1 | (6-1) | 1 | — | 0 |
| 91 | (1) | 40 | (2-1) | 16 | (3-1) | 41 | — | 0 | (5-3) | 1 | (6-2) | 2 | — | 0 |
| 92 | (1) | 8.5 | (2-2) | 36.5 | (3-1) | 49 | — | 0 | (5-4) | 1 | (6-3) | 5 | — | 0 |

Unit: g

The finished dye products in Examples 67-92 were subjected to performance test.

The detailed test procedures are as follows:

In accordance with the method similar with that described in GB/T2394-2003, the finished dye products of Examples 67-92 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight and the compatibility of the samples were determined using AATCC16-2004 and the method described in Example 46. The results are shown in Table 38.

TABLE 38

| Example | Fastness to sunlight | Compatibility |
|---|---|---|
| 67 | 3 | I |
| 68 | 3 | I |
| 69 | 3 | I |
| 70 | 3 | I |
| 71 | 3 | II |
| 72 | 3 | I |
| 73 | 3 | I |
| 74 | 3 | I |
| 75 | 3 | I |
| 76 | 3 | II |
| 77 | 3 | II |
| 78 | 3 | II |
| 79 | 3 | II |
| 80 | 3 | II |
| 81 | 3 | II |
| 82 | 3 | II |
| 83 | 3 | II |
| 84 | 3 | II |
| 85 | 3 | II |
| 86 | 3 | II |
| 87 | 3 | II |
| 88 | 3 | I |
| 89 | 3 | I |
| 90 | 3 | II |
| 91 | 3 | I |
| 92 | 3 | II |

Example 93

Into 41 g of dye component of formula (1), 16 g of dye component of formula (2-2), a mixture of 30 g of dye component of formula (3-1) and 13 g of dye component of formula (3-2), 80 g of dispersant MF and 80 g of lignin 85 A, 390 g of water were added. The resultant mixture was stirred till well homogenized, ground, dispersed and dried to obtain the finished dye product. The finished dye product was used in the dyeing process to produce black polyester fabrics with excellent fastness properties.

Comparative Example 93

The same procedure in Example 93 was repeated except that the dye component of formula (1) in Example 93 was replaced by the dye component of the following formula (8):

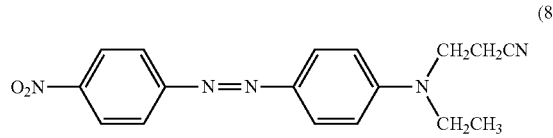

The finished dye products in Example 93 and Comparative Example 93 were subjected to performance test.

The detailed test procedures are as follows:

In accordance with the method similar with that described in GB/T2394-2003, the finished dye products of Example 93 and Comparative Example 93 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength of the samples was determined using GB/T6688-2008. The results are shown in Table 39.

TABLE 39

| Sample name | Strength |
|---|---|
| Example 93 | 102% |
| Comparative Example 93 | 100% |

Higher strength means that, during printing and dyeing, a lower amount of dye is required for dyeing the fabrics to a certain color depth. Therefore the cost of printing and dyeing is reduced.

Example 94

Into 41 g of dye component of formula (1), 16 g of dye component of formula (2-1), a mixture of 30 g of dye component of formula (3-1) and 13 g of dye component of formula (3-2), 80 g of dispersant MF and 80 g of lignin 85 A, 390 g of water were added. The resultant mixture was stirred till well homogenized, ground, dispersed and dried to obtain the finished dye product. The finished dye product was used in the dyeing process to produce black polyester fabrics with excellent fastness properties.

Comparative Example 94

The same procedure in Example 94 was repeated except that the dye component of formula (1) in Example 94 was replaced by the dye component of the following formula (9):

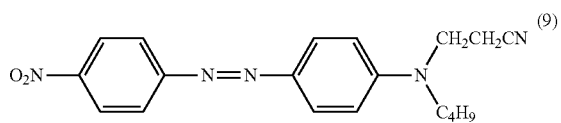

The finished dye products in Example 94 and Comparative Example 94 were subjected to performance test.

The detailed test procedures are as follows:

In accordance with the method similar with that described in GB/T2394-2003, the finished dye products of Example 94 and Comparative Example 94 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight of the samples was determined using AATCC16-2004. The results are shown in Table 40.

TABLE 40

| Sample name | Fastness to sunlight (40 h) |
|---|---|
| Example 94 | 3 |
| Comparative Example 94 | 2 |

Example 95

Into 41 g of dye component of formula (1), 16 g of dye component of formula (2-1), a mixture of 30 g of dye component of formula (3-1) and 13 g of dye component of formula (3-2) and 30 g of dispersant MF, 200 g of water were added. The resultant mixture was stirred till well homogenized, ground, dispersed and dried to obtain the finished dye product. The finished dye product was used in the dyeing process to produce black polyester fabrics with excellent fastness properties.

Comparative Example 95

The same procedure in Example 95 was repeated except that the dye component of formula (1) in Example 95 was replaced by the dye component of formula (4-1):

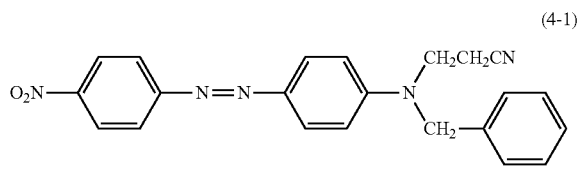

(4-1)

The finished dye products in Example 95 and Comparative Example 95 were subjected to performance test.

The detailed test procedures are as follows:

In accordance with the method similar with that described in GB/T2394-2003, the finished dye products of Example 95 and Comparative Example 95 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength, the fastness to sunlight and the compatibility of the samples were determined using GB/T6688-2008 and AATCC16-2004, with reference to GB/T2400-2006. The results are shown in Table 41.

TABLE 41

| Sample name | Strength | Fastness to sunlight | Compatibility |
|---|---|---|---|
| Example 95 | 105% | 2~3 | II |
| Comparative Example 95 | 100% | 2 | III |

Method for determining compatibility: the dyeing process was performed in accordance with GB/T2394-2003. The fabrics were put into dyeing at 60° C. A sample was collected once the temperature was increased to 80° C., then the samples were collected with a temperature interval of 101° C. till 130° C. The samples were also collected when the temperature was kept at 130° C. for 10 min, 20 min, 30 min and 50 min, respectively. Totally 10 cloth samples were collected. The sample collected when the temperature was kept at 130° C. for 50 min was used as standard sample. The test samples, i.e. the samples collected at each temperature levels, were checked to determine whether the hue change was synchronized. The results were classified into five grades: I, II, III, IV and V (instrument: datacolor 600 color photometer, colour difference formula CMC 2:1). For black color, the number of the cloth samples that both the DC (brilliance contrast) and the DH (hue difference) of which are less than 0.6 was counted.

Grade I: Five cloth samples or more
Grade II: Four cloth samples
Grade III: Three cloth samples
Grade IV: Two cloth samples
Grade V: One cloth sample Example 96

Into 41 g of dye component of formula (1), 16 g of dye component of formula (2-2), a mixture of 30 g of dye component of formula (3-1) and 13 g of dye component of formula (3-2), 30 g of dispersant MF and 30 g of diffusant NNO, 250 g of water were added. The resultant mixture was stirred till well homogenized, ground, dispersed and dried to obtain the finished dye product. The finished dye product was used in the dyeing process to produce black polyester fabrics with excellent fastness properties.

Comparative Example 96

The same procedure in Example 96 was repeated except that the dye component of formula (1) in Example 96 was replaced by the dye component of the following formula (10):

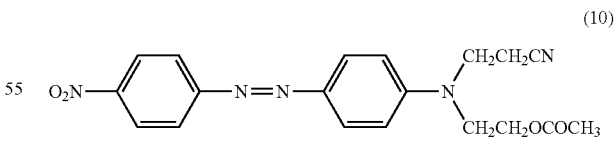

(10)

The finished dye products in Example 96 and Comparative Example 96 were subjected to performance test.

The detailed test procedures are as follows:

In accordance with the method similar with that described in GB/T2394-2003, the finished dye products of Example 96 and Comparative Example 96 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the stability range of pH value of the samples were determined using GB/T6688-2008, with reference to GB/T2403-2006. The results are shown in Table 42.

TABLE 42

| Sample name | Strength | stability range of pH value |
| --- | --- | --- |
| Example 96 | 107% | 3~9 |
| Comparative Example 96 | 100% | 3~7 |

Note:
stability range of pH value: The pH value range that strength≥95% was taken as the stability range of pH value.

Example 97

Into 44 g of dye component of formula (1), 22 g of dye component of formula (2-2), a mixture of 30.6 g of dye component of formula (3-1) and 3.4 g of dye component of formula (3-2), 31 g of dispersant MF and 31 g of diffusant NNO, 200 g of water were added. The resultant mixture was stirred till well homogenized, ground, dispersed and dried to obtain the finished dye product. The finished dye product was used in the dyeing process to produce black polyester fabrics with excellent fastness properties.

Comparative Example 97

The same procedure in Example 97 was repeated except that 44 g of the dye component of formula (1) in Example 97 was replaced by 41.4 g of the dye component of formula (10) and 2.6 g of the dye component of formula (11):

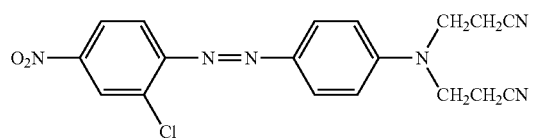

(11)

The finished dye products in Example 97 and Comparative Example 97 were subjected to performance test.

The detailed test procedures are as follows:

In accordance with the method similar with that described in GB/T2394-2003, the finished dye products of Example 97 and Comparative Example 97 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 601° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the stability range of pH value of the samples were determined using GB/T6688-2008, with reference to GB/T2403-2006. The results are shown in Table 43.

TABLE 43

| Sample name | Strength | stability range of pH value |
| --- | --- | --- |
| Example 97 | 107% | 3~9 |
| Comparative Example 97 | 100% | 3~7 |

Note:
stability range of pH value: The pH value range that strength≥95% was taken as the stability range of pH value.

Example 98

Into 7.8 g of dye component of formula (1), 7.8 g of dye component of formula (4-1), 6.0 g of dye component of formula (2-1), a mixture of 13.1 g of dye component of formula (3-1) and 3.3 g of dye component of formula (3-2), 31 g of dispersant MF and 31 g of lignin 85 A, 200 g of water were added. The resultant mixture was stirred till well homogenized, ground, dispersed and dried to obtain the finished dye product. The finished dye product was used in the dyeing process to produce black polyester fabrics with excellent fastness properties.

Comparative Example 98

The same procedure in Example 98 was repeated except that the dye component of formula (1) in Example 98 was replaced by the dye component of formula (8):

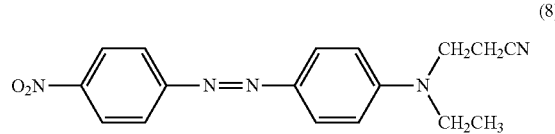

(8)

The finished dye products in Example 98 and Comparative Example 98 were subjected to performance test.

The detailed test procedures are as follows:

In accordance with the method similar with that described in GB/T2394-2003, the finished dye products of Example 98 and Comparative Example 98 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength of the samples was determined using GB/T6688-2008. The results are shown in Table 44.

TABLE 44

| Sample name | Strength |
| --- | --- |
| Example 98 | 102% |
| Comparative Example 98 | 100% |

Example 99

Into 9.5 g of dye component of formula (1), 36.5 g of dye component of formula (2-2), a mixture of 27 g of dye component of formula (3-1) and 27 g of dye component of formula (3-2), 80 g of dispersant MF and 80 g of lignin 85 A, 390 g of water were added. The resultant mixture was stirred till well homogenized, ground, dispersed and dried to obtain the finished dye product. The finished dye product was used in the dyeing process to produce blue polyester fabrics with excellent fastness properties.

Comparative Example 99

The same procedure in Example 99 was repeated except that 9.5 g of the dye component of formula (1) in Example 99 was replaced by 5 g of the dye component of formula (1), 36.5 g of the dye component of formula (2-2) was replaced by 41 g of the dye component of formula (2-2), and the mixture of 27 g of dye component of formula (3-1) and 27 g of dye component of formula (3-2) was replaced by 54 g of the dye component of formula (3-1).

The finished dye products in Example 99 and Comparative Example 99 were subjected to performance test.

The detailed test procedures are as follows:

In accordance with the method similar with that described in GB/T2394-2003, the finished dye products of Example 99 and Comparative Example 99 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to washing of the samples was determined using GB/T3921-2008. The results are shown in Table 45.

TABLE 45

| Sample name | Fastness to washing |
| --- | --- |
| Example 99 | 4~5 |
| Comparative Example 99 | 4 |

Example 100

Into 12 g of dye component of formula (1), 34 g of dye component of formula (2-2), a mixture of 10.8 g of dye component of formula (3-1) and 43.2 g of dye component of formula (3-2), 80 g of dispersant MF and 80 g of lignin 85 A, 390 g of water were added. The resultant mixture was stirred till well homogenized, ground, dispersed and dried to obtain the finished dye product. The finished dye product was used in the dyeing process to produce blue polyester fabrics with excellent fastness properties.

Comparative Example 100

The same procedure in Example 100 was repeated except that the mixture of 10.8 g of dye component of formula (3-1) and 43.2 g of dye component of formula (3-2) in Example 100 was replaced by 54 g of the dye component of formula (3-2).

The finished dye products in Example 100 and Comparative Example 100 were subjected to performance test.

The detailed test procedures are as follows:

In accordance with the method similar with that described in GB/T2394-2003, the finished dye products of Example 100 and Comparative Example 100 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the fastness to sunlight of the samples were determined using GB/6688-2008 and AATCC16-2004. The results are shown in Table 46.

TABLE 46

| Sample name | Strength | Fastness to sunlight (40 h) |
| --- | --- | --- |
| Example 100 | 103.5% | 2~3 |
| Comparative Example 100 | 100% | 2 |

Examples 101

According to the formulation shown in Table 47, the finished dye product was prepared in the same manner as described in Example 100.

TABLE 47

| Example | Component A | | Component B | | Component C | | Assistant | | Unit: g Water |
| --- | --- | --- | --- | --- | --- | --- | --- | --- | --- |
| | Formula | Weight | Formula | Weight | Formula | Weight | Brand name | Weight | Weight |
| 101 | (1) | 73 | (2-2) | 7 | (3-1) | 0.2 | Diffusant CNF | 100 | 200 |
| | | | | | (3-2) | 19.8 | | | |

The finished dye product in Example 101 was subjected to performance test.

The detailed test procedures are as follows:

In accordance with the method similar with that described in GB/T2394-2003, the finished dye product of Example 101 was weighed in an amount of 0.5 g, and added into 250 ml of water to prepare disperse dye suspensions. 10 ml of suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight of the samples was determined using AATCC16-2004 method. The results are shown in Table 48.

TABLE 48

| Example | Fastness to sunlight |
|---------|----------------------|
| 101     | 3                    |

Examples 102-109

According to the formulation shown in Table 49, the finished dye product was prepared in the same manner as described in Example 100.

The finished dye products in Examples 102-109 were subjected to performance test.

The detailed test procedures are as follows:

In accordance with the method similar with that described in GB/T2394-2003, the finished dye products of Examples 102-109 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, the fastness to sunlight and the compatibility of the samples was determined using AATCC16-2004 and the method described in Example 95. The results are shown in Table 50.

TABLE 50

| Example | Fastness to sunlight | Compatibility |
|---------|----------------------|---------------|
| 102     | 3                    | II            |
| 103     | 2~3                  | II            |
| 104     | 3                    | II            |
| 105     | 2~3                  | II            |
| 106     | 3                    | II            |
| 107     | 2~3                  | II            |
| 108     | 2~3                  | II            |
| 109     | 3                    | II            |

Examples 110-111

According to the formulation shown in Table 51, and the finished dye product were prepared.

TABLE 49

| Example | Component A Formula | Component A Weight | Component B Formula | Component B Weight | Component C Formula | Component C Weight | Assistant Brand name | Assistant Weight | Water Weight (Unit: g) |
|---------|---------------------|--------------------|---------------------|--------------------|---------------------|--------------------|----------------------|------------------|-----------------------|
| 102     | (1)                 | 2                  | (2-1)               | 40                 | (3-1)               | 57.5               | Dispersant MF        | 30               | 520                   |
|         |                     |                    |                     |                    | (3-2)               | 0.5                |                      |                  |                       |
| 103     | (1)                 | 3                  | (2-2)               | 39                 | (3-1)               | 17.4               | Diffusant CNF        | 150              | 38.8                  |
|         |                     |                    |                     |                    | (3-2)               | 40.6               | Glauber salt         | 10               |                       |
| 104     | (1)                 | 50                 | (2-2)               | 12                 | (3-1)               | 26.6               | Lignin 85A           | 200              | 13                    |
|         |                     |                    |                     |                    | (3-2)               | 11.4               |                      |                  |                       |
| 105     | (1)                 | 9.5                | (2-2)               | 36.5               | (3-1)               | 16.2               | Lignin 83A           | 400              | 43.5                  |
|         |                     |                    |                     |                    | (3-2)               | 37.8               |                      |                  |                       |
| 106     | (1)                 | 50                 | (2-2)               | 12                 | (3-1)               | 34.2               | Lignin 85A           | 200              | 13                    |
|         |                     |                    |                     |                    | (3-2)               | 3.8                |                      |                  |                       |
| 107     | (1)                 | 9.5                | (2-2)               | 36.5               | (3-1)               | 5.4                | Lignin 83A           | 400              | 43.5                  |
|         |                     |                    |                     |                    | (3-2)               | 48.6               |                      |                  |                       |
| 108     | (1)                 | 50                 | (2-2)               | 12                 | (3-1)               | 7.6                | Lignin 85A           | 200              | 13                    |
|         |                     |                    |                     |                    | (3-2)               | 30.4               |                      |                  |                       |
| 109     | (1)                 | 9.5                | (2-2)               | 36.5               | (3-1)               | 43.2               | Lignin 83A           | 400              | 43.5                  |
|         |                     |                    |                     |                    | (3-2)               | 10.8               |                      |                  |                       |

TABLE 51

Unit: g

| Example | Component A Formula | Weight | Component B Formula | Weight | Component C Formula | Weight | Component D Formula | Weight | Component E Formula | Weight | Component F Formula | Weight | Component G Formula | Weight |
|---|---|---|---|---|---|---|---|---|---|---|---|---|---|---|
| 110 | (1) | 72 | (2-2) | 7 | (3-1)<br>(3-2) | 16<br>4 | — | 0 | — | 0 | (6-2) | 1 | — | |
| 111 | (1) | 72 | (2-2) | 7 | (3-1)<br>(3-2) | 8<br>12 | — | 0 | — | 0 | — | 0 | (7) | 1 |

The finished dye products in Examples 110-111 were subjected to performance test.

The detailed test procedures are as follows:

In accordance with the method similar with that described in GB/T2394-2003, the finished dye products of Examples 110-111 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight of the samples was determined using the method of AATCC16-2004. The results are shown in Table 52.

TABLE 52

| Example | Fastness to sunlight |
|---|---|
| 110 | 3 |
| 111 | 3 |

Examples 112-127

According to the formulation shown in Table 53, and the finished dye product were prepared.

TABLE 53

Unit: g

| Example | Component A Formula | Weight | Component B Formula | Weight | Component C Formula | Weight | Component D Formula | Weight | Component E Formula | Weight | Component F Formula | Weight | Component G Formula | Weight |
|---|---|---|---|---|---|---|---|---|---|---|---|---|---|---|
| 112 | (1) | 2 | (2-1) | 40 | (3-1)<br>(3-2) | 56.5<br>0.5 | (4-1) | 1 | — | 0 | — | 0 | — | 0 |
| 113 | (1) | 3 | (2-2) | 7 | (3-1)<br>(3-2) | 0.2<br>19.8 | (4-2) | 70 | — | 0 | — | 0 | — | 0 |
| 114 | (1) | 38 | (2-1) | 16 | (3-1)<br>(3-2) | 2.2<br>40.8 | (4-3) | 3 | — | 0 | — | 0 | — | 0 |
| 115 | (1) | 9 | (2-1) | 36.5 | (3-1)<br>(3-2) | 51.3<br>2.7 | (4-4) | 0.5 | — | 0 | — | 0 | — | 0 |
| 116 | (1) | 63 | (2-1) | 7 | (3-1)<br>(3-2) | 2<br>18 | — | 0 | (5-1) | 10 | — | 0 | — | 0 |
| 117 | (1) | 38 | (2-2) | 16 | (3-1)<br>(3-2) | 37<br>4 | — | 0 | (5-2) | 5 | — | 0 | — | 0 |
| 118 | (1) | 8.5 | (2-1) | 36.5 | (3-1)<br>(3-2) | 8.1<br>45.9 | — | 0 | (5-3) | 1 | — | 0 | — | 0 |
| 119 | (1) | 37 | (2-2) | 16 | (3-1)<br>(3-2) | 36.5<br>6.5 | — | 0 | (5-4) | 4 | — | 0 | — | 0 |
| 120 | (1) | 2 | (2-2) | 40 | (3-1)<br>(3-2) | 11<br>44 | — | 0 | — | 0 | (6-1) | 3 | — | 0 |
| 121 | (1) | 2 | (2-2) | 40 | (3-1)<br>(3-2) | 12<br>36 | — | 0 | — | 0 | (6-3) | 10 | — | 0 |
| 122 | (1) | 9 | (2-1) | 24 | (3-1)<br>(3-2) | 14<br>6 | — | 0 | — | 0 | (6-4) | 47 | — | 0 |
| 123 | (1) | 41 | (2-2) | 16 | (3-1)<br>(3-2) | 6.9<br>16.1 | — | 0 | — | 0 | (6-5) | 20 | — | 0 |
| 124 | (1) | 2 | (2-2) | 40 | (3-1)<br>(3-2) | 33.6<br>14.4 | — | 0 | — | 0 | — | 0 | (7) | 10 |
| 125 | (1) | 9 | (2-2) | 24 | (3-1)<br>(3-2) | 14<br>6 | — | 0 | — | 0 | — | 0 | (7) | 47 |
| 126 | (1) | 41 | (2-2) | 16 | (3-1)<br>(3-2) | 20<br>20 | — | 0 | — | 0 | — | 0 | (7) | 3 |
| 127 | (1) | 9.5 | (2-2) | 36.5 | (3-1)<br>(3-2) | 26<br>26 | — | 0 | — | 0 | — | 0 | (7) | 2 |

The finished dye products in Examples 112-127 were subjected to performance test.

The detailed test procedures are as follows:

In accordance with the method similar with that described in GB/T2394-2003, the finished dye products of Examples 112-127 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, the fastness to sunlight and the compatibility of the samples was determined using AATCC16-2004 and the method described in Example 3. The results are shown in Table 54.

TABLE 54

| Example | Fastness to sunlight | Compatibility |
|---|---|---|
| 112 | 2~3 | II |
| 113 | 2~3 | II |
| 114 | 2~3 | I |
| 115 | 3 | II |
| 116 | 3 | II |
| 117 | 3 | I |
| 118 | 2~3 | I |
| 119 | 3 | I |
| 120 | 2~3 | II |
| 121 | 2~3 | II |
| 122 | 2~3 | II |
| 123 | 2~3 | II |
| 124 | 3 | II |
| 125 | 2~3 | II |
| 126 | 3 | II |
| 127 | 3 | II |

Example 128

Into 41 g of dye component of formula (1), 16 g of dye component of formula (2-1), 43 g of dye component of formula (3-2), 80 g of dispersant MF and 80 g of lignin 85 A, 390 g of water were added. The mixture was stirred till well homogenized, ground, dispersed and dried to obtain the finished dye product. The finished dye product was used in the dyeing process to produce black polyester fabrics with excellent fastness properties.

Comparative Example 128

The same procedure in Example 128 was repeated except that the dye component of formula (1) in Example 128 was replaced by the dye component of the following formula (8):

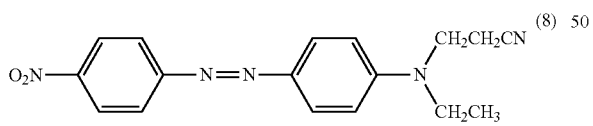

The finished dye products in Example 128 and Comparative Example 128 were subjected to performance test.

The detailed test procedures are as follows:

In accordance with the method similar with that described in GB/T2394-2003, the finished dye products of Example 128 and Comparative Example 128 were weighed in an amount of 0.5 g, and added into 250 ml of water respectively to prepare disperse dye suspensions. 10 ml of each suspension was sucked up and mixed with 90 nil of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the fastness to washing of the samples were determined using GB/T6688-2008 and GB/T3921-2008. The results are shown in Table 55.

TABLE 55

| Sample name | Strength | Fastness to washing |
|---|---|---|
| Example 128 | 102% | 5 |
| Comparative Example 128 | 100% | 4~5 |

Higher strength means that, during printing and dyeing, a lower amount of dye is required for dyeing the fabrics to a certain color depth. Therefore the cost of printing and dyeing is reduced.

Example 129

Into 41 g of dye component of formula (1), 16 g of dye component of formula (2-1), 43 g of dye component of formula (3-2), 80 g of dispersant MF and 80 g of lignin 85 A, 390 g of water were added. The mixture was stirred till well homogenized, ground, dispersed and dried to obtain the finished dye product. The finished dye product was used in the dyeing process to produce black polyester fabrics with excellent fastness properties.

Comparative Example 129

The same procedure in Example 129 was repeated except that the dye component of formula (1) in Example 129 was replaced by the dye component of the following formula (9):

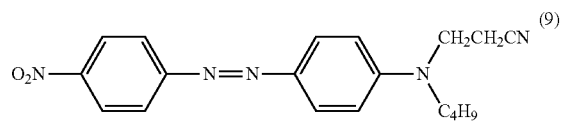

The finished dye products in Example 129 and Comparative Example 129 were subjected to performance test.

The detailed test procedures are as follows:

In accordance with the method similar with that described in GB/T2394-2003, the finished dye products of Example 129 and Comparative Example 129 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight of the samples was determined using AATCC16-2004. The results are shown in Table 56.

TABLE 56

| Sample name | Fastness to sunlight (40 h) |
|---|---|
| Example 129 | 2~3 |
| Comparative Example 129 | 2 |

Example 130

Into 41 g of dye component of formula (1), 16 g of dye component of formula (2-1), 43 g of dye component of formula (3-2) and 30 g of dispersant MF, 200 g of water were added. The mixture was stirred till well homogenized, ground, and dispersed to obtain the finished dye product slurry. The finished dye product slurry was used in the dyeing process to produce black polyester fabrics with excellent fastness properties.

Comparative Example 130

The same procedure in Example 130 was repeated except that the dye component of formula (1) in Example 130 was replaced by the dye component of formula (4-1):

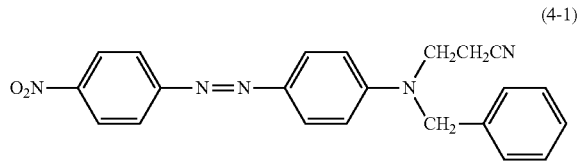

(4-1)

The finished dye products in Example 130 and Comparative Example 130 were subjected to performance test.

The detailed test procedures are as follows:

In accordance with the method similar with that described in GB/T2394-2003, the finished dye products of Example 130 and Comparative Example 130 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength, the fastness to sunlight and the compatibility of the samples were determined using GB/T6688-2008 and AATCC16-2004, with reference to GB/T2400-2006. The results are shown in Table 57.

TABLE 57

| Sample name | Strength | Fastness to sunlight | Compatibility |
|---|---|---|---|
| Example 130 | 105% | 2~3 | II |
| Comparative Example 130 | 100% | 2 | III |

Method for determining compatibility: the dyeing process was performed in accordance with GB/T2394-2003. The fabrics were put into dyeing at 60° C. A sample was collected once the temperature was increased to 80° C., then the samples were collected with a temperature interval of 10° C. till 130° C. The samples were also collected when the temperature was kept at 130° C. for 10 min, 20 min, 30 min and 50 min, respectively. Totally 10 cloth samples were collected. The sample collected when the temperature was kept at 130° C. for 50 min was used as standard sample. The test samples, i.e. the samples collected at each temperature levels, were checked to determine whether the hue change was synchronized. The results were classified into five grades: I, II, III, IV and V (instrument: datacolor 600 color photometer, colour difference formula CMC 2:1). For black color, the number of the cloth samples that both the DC (brilliance contrast) and the DH (hue difference) of which are less than 0.6 was counted.

Grade I: Five cloth samples or more
Grade II: Four cloth samples
Grade III: Three cloth samples
Grade IV: Two cloth samples
Grade V: One cloth sample Example 131

Into 41 g of dye component of formula (1), 16 g of dye component of formula (2-1), 43 g of dye component of formula (3-2), 30 g of dispersant MF and 30 g of diffusant NNO, 250 g of water were added. The mixture was stirred till well homogenized, ground and dispersed to obtain the finished dye product slurry. The finished dye product slurry was used in the dyeing process to produce black polyester fabrics with excellent fastness properties.

Comparative Example 131

The same procedure in Example 131 was repeated except that the dye component of formula (1) in Example 131 was replaced by the dye component of the following formula (10):

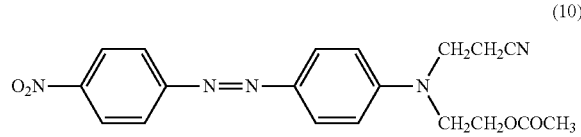

(10)

The finished dye products in Example 131 and Comparative Example 131 were subjected to performance test.

The detailed test procedures are as follows:

In accordance with the method similar with that described in GB/T2394-2003, the finished dye products of Example 131 and Comparative Example 131 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the stability range of pH value of the samples were determined using GB/T6688-2008, with reference to GB/T2403-2006. The results are shown in Table 58.

TABLE 58

| Sample name | Strength | stability range of pH value |
| --- | --- | --- |
| Example 131 | 107% | 3~9 |
| Comparative Example 131 | 100% | 3~7 |

Note:
stability range of pH value: The pH value range that strength≥95% was taken as the stability range of pH value.

Example 132

Into 44 g of dye component of formula (1), 22 g of dye component of formula (2-1), 34 g of dye component of formula (3-2), 31 g of dispersant MF and 31 g of diffusant NNO, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 132

The same procedure in Example 132 was repeated except that 44 g of the dye component of formula (1) in Example 132 was replaced by 41.4 g of the dye component of formula (10) and 2.6 g of the dye component of formula (11):

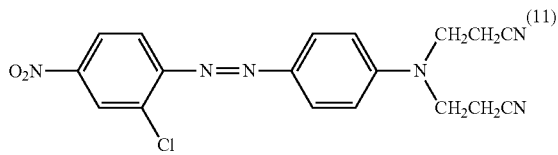

The finished dye products in Example 132 and Comparative Example 132 were subjected to performance test.

The detailed test procedures are as follows:

In accordance with the method similar with that described in GB/T2394-2003, the finished dye products of Example 132 and Comparative Example 132 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the stability range of pH value of the samples were determined using GB/T6688-2008, with reference to GB/T2403-2006. The results are shown in Table 59.

TABLE 59

| Sample name | Strength | stability range of pH value |
| --- | --- | --- |
| Example 132 | 107% | 3~9 |
| Comparative Example 132 | 100% | 3~7 |

Note:
stability range of pH value: The pH value range that strength≥95% was taken as the stability range of pH value.

Example 133

Into 7.8 g of dye component of formula (1), 7.8 g of dye component of formula (4-1), 6.0 g of dye component of formula (2-1), 16.4 g of dye component of formula (3-2), 31 g of dispersant MF and 31 g of lignin 85 A, 200 g of water were added. The mixture was stirred till well homogenized, ground, dispersed and dried to obtain the finished dye product. The finished dye product was used in the dyeing process to produce black polyester fabrics with excellent fastness properties.

Comparative Example 133

The same procedure in Example 133 was repeated except that the dye component of formula (1) in Example 133 was replaced by the dye component of formula (8):

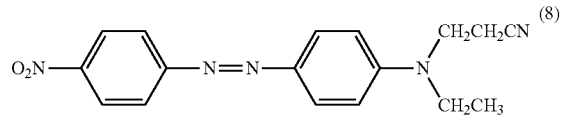

The finished dye products in Example 133 and Comparative Example 133 were subjected to performance test.

The detailed test procedures are as follows:

In accordance with the method similar with that described in GB/T2394-2003, the finished dye products of Example 133 and Comparative Example 133 were weighed in an amount of 0.5 g, and added into 250 ml of water respectively to prepare disperse dye suspensions. 10 ml of each suspension was sucked up and mixed with 90 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the strength and the fastness to washing of the samples were determined using GB/T6688-2008 and GB/T3921-2008. The results are shown in Table 60.

TABLE 60

表 60

| Sample name | Strength | Fastness to washing |
| --- | --- | --- |
| Example 133 | 102% | 5 |
| Comparative Example 133 | 100% | 4~5 |

Example 134

Into 9.5 g of dye component of formula (1), 36.5 g of dye component of formula (2-1), 54 g of dye component of formula (3-2), 80 g of dispersant MF and 80 g of lignin 85 A, 390 g of water were added. The mixture was stirred till well homogenized, ground, dispersed and dried to obtain the finished dye product. The finished dye product was used in the dyeing process to produce blue polyester fabrics with excellent fastness properties.

Comparative Example 134

The same procedure in Example 134 was repeated except that the dye component of formula (3-2) in Example 134 was replaced by the dye component of the following formula (13)

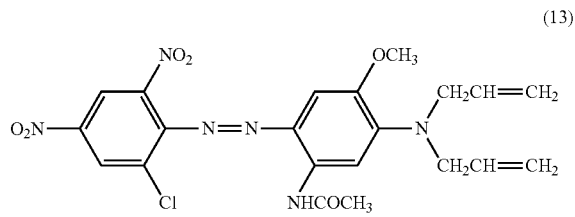

The finished dye products in Example 134 and Comparative Example 134 were subjected to performance test.

The detailed test procedures are as follows:

In accordance with the method similar with that described in GB/T2394-2003, the finished dye products of Example 134 and Comparative Example 134 were weighed in an amount of 0.5 g, and added into 250 ml of water respectively to prepare disperse dye suspensions. 30 ml of each suspension was sucked up and mixed with 70 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to washing and the content of chlorophenol of the samples were determined using GB/T3921-2008 and GB/T18414.1-2006. The results are shown in Table 61.

TABLE 61

| Sample name | Fastness to washing | Content of chlorophenol |
|---|---|---|
| Example 134 | 5 | <0.05 |
| Comparative Example 134 | 4~5 | >0.05 | finished dye product. The finished dye product was used in the dyeing process to produce blue polyester fabrics with excellent fastness properties.

Comparative Example 135

The same procedure in Example 135 was repeated except that 54 g of the dye component of formula (3-2) in Example 135 was replaced by a mixture of 27 g of the dye component of formula (13) and 27 g of the dye component of formula (3-2).

The finished dye products in Example 135 and Comparative Example 135 were subjected to performance test, The detailed test procedures are as follows:

In accordance with the method similar with that described in GB/T2394-2003, the finished dye products of Example 135 and Comparative Example 135 were weighed in an amount of 0.5 g, and added into 250 ml of water respectively to prepare disperse dye suspensions. 30 ml of each suspension was sucked up and mixed with 70 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min. kept for 45 min, then cooled down to 80° C., and the samples were collected.

The shade of the cloth samples was observed, and the fastness to washing and the content of chlorophenol of the samples were determined using GB/T6688-2008 and GB/T18414.1-2006. The results are shown in Table 62.

TABLE 62

| Sample name | Fastness to washing | Content of chlorophenol |
|---|---|---|
| Example 135 | 5 | <0.05 |
| Comparative Example 135 | 4-5 | >0.05 |

Examples 136-137

According to the formulation shown in Table 63, the finished dye product was prepared in the same manner as described in Example 135.

TABLE 63

| | Component A | | Component B | | Component C | | Assistant | | Unit: g Water |
|---|---|---|---|---|---|---|---|---|---|
| Example | Formula | Weight | Formula | Weight | Formula | Weight | Brand name | Weight | Weight |
| 136 | (1) | 2 | (2-1) | 40 | (3-2) | 58 | Dispersant MF | 30 | 520 |
| 137 | (1) | 3 | (2-1) | 39 | (3-2) | 58 | Dispersant MF Glauber salt | 100 | 18 |

Example 135

Into 12 g of dye component of formula (1), 34 g of dye component of formula (2-1), 54 g of dye component of formula (3-2), 80 g of dispersant MF and 80 g of lignin A, 390 g of water were added. The mixture was stirred till well homogenized, ground, dispersed and dried to obtain the The finished dye products in Examples 136-137 were subjected to performance test.

The detailed test procedures are as follows:

In accordance with the method similar with that described in GB/T2394-2003, the finished dye products of Examples 136-137 were weighed in an amount of 0.5 g, and added into 250 ml of water respectively to prepare disperse dye suspensions. 30 ml of each suspension was sucked up and mixed with 70 ml of water. The pH value of the dyeing bath was adjusted to 5 with acetic acid, then the temperature was increased to 60'. At the same time, 2 g of polyester fiber was put into the bath, and stained under high temperature and high pressure. The temperature was gradually increased to 130° C. within 35 min, kept for 45 min, then cooled down to 80', and the samples were collected.

The shade of the cloth samples was observed, and the fastness to washing, the compatibility and the content of chlorophenol of the samples were determined using GB/T3921-2008, the method described in Example 130 and GB/T18414.1-2006. The results are shown in Table 64.

TABLE 64

| Example | Fastness to washing | Compatibility | Content of chlorophenol |
|---------|---------------------|---------------|-------------------------|
| 136     | 5                   | II            | <0.05                   |
| 137     | 5                   | II            | <0.05                   |

Examples 138

According to the formulation shown in Table 65, the finished dye product was prepared in the same manner as described in Example 135.

TABLE 65

|         | Component A | | Component B | | Component C | | Assistant | | Unit: g Water |
|---------|-------------|--------|-------------|--------|-------------|--------|-----------|--------|-------|
| Example | Formula | Weight | Formula | Weight | Formula | Weight | Brand name | Weight | Weight |
| 138     | (1)     | 73     | (2-1)   | 7      | (3-2)   | 20     | Diffusant CNF | 100 | 200 |

The finished dye product in Example 138 was subjected to performance test.

The detailed test procedures are as follows:

In accordance with the method similar with that described in GB/T2394-2003, the finished dye product of Examples 138 was weighed in an amount of 0.5 g, and added into 250 ml of water to prepare disperse dye suspensions. 30 ml of suspension was sucked up and mixed with 70 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight, the fastness to washing and the content of chlorophenol of the samples were determined using AATCC16-2004, GB/T3921-2008 and GB/T18414.1-2006. The results are shown in Table 66.

TABLE 66

| Example | Fastness to sunlight | Fastness to washing | Content of chlorophenol |
|---------|----------------------|---------------------|-------------------------|
| 138     | 3                    | 5                   | <0.05                   |

Examples 139-141

According to the formulation shown in Table 67, the finished dye product was prepared in the same manner as described in Example 135.

TABLE 67

|         | Component A | | Component B | | Component C | | Assistant | | Unit: g Water |
|---------|-------------|--------|-------------|--------|-------------|--------|-----------|--------|-------|
| Example | Formula | Weight | Formula | Weight | Formula | Weight | Brand name | Weight | Weight |
| 139     | (1)     | 41     | (2-1)   | 16     | (3-2)   | 43     | Diffusant CNF | 150 | 38.8 |
|         |         |        |         |        |         |        | Glauber salt | 10 | |
| 140     | (1)     | 9.5    | (2-1)   | 36.5   | (3-2)   | 54     | Lignin 85A | 200 | 13 |
| 141     | (1)     | 50     | (2-1)   | 12     | (3-2)   | 38     | Dispersant MF | 100 | 22 |
|         |         |        |         |        |         |        | Lignin 83A | | |

The finished dye products in Examples 139-141 were subjected to performance test.

The detailed test procedures are as follows:

In accordance with the method similar with that described in GB/T2394-2003, the finished dye products of Examples 139-141 were weighed in an amount of 0.5 g, and added into 250 ml of water respectively to prepare disperse dye suspensions. 30 ml of each suspension was sucked up and mixed with 70 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80', and the samples were collected.

The shade of the cloth samples was observed, and the fastness to sunlight, the fastness to washing, the compatibility and the content of chlorophenol of the samples were determined using AATCC16-2004, GB/T3921-2008, the method described in Example 130 and GB/T18414.1-2006. The results are shown in Table 68.

TABLE 68

| Example | Fastness to sunlight | Fastness to washing | Compatibility | Content of chlorophenol |
|---|---|---|---|---|
| 139 | 2~3 | 5 | II | <0.05 |
| 140 | 2~3 | 5 | II | <0.05 |
| 141 | 2~3 | 5 | II | <0.05 |

Examples 142-152

According to the formulation shown in Table 69, and the finished dye products were prepared.

TABLE 69

Unit: g

| | Component A | | Component B | | Component C | | Component D | | Component E | | Component F | | Component G | |
|---|---|---|---|---|---|---|---|---|---|---|---|---|---|---|
| Example | Formula | Weight | Formula | Weight | Formula | Weight | Formula | Weight | Formula | Weight | Formula | Weight | Formula | Weight |
| 142 | (1) | 3 | (2-1) | 7 | (3-2) | 20 | (4-1) | 70 | — | 0 | — | 0 | — | 0 |
| 143 | (1) | 4.5 | (2-1) | 36.5 | (3-2) | 54 | (4-8) | 5 | — | 0 | — | 0 | — | 0 |
| 144 | (1) | 2 | (2-1) | 37 | (3-2) | 55 | (4-1) | 6 | — | 0 | — | 0 | — | 0 |
| 145 | (1) | 6 | (2-1) | 37 | (3-2) | 55 | (4-2) | 2 | — | 0 | — | 0 | — | 0 |
| 146 | (1) | 3 | (2-1) | 12 | (3-2) | 35 | (4-3) | 50 | — | 0 | — | 0 | — | 0 |
| 147 | (1) | 2 | (2-1) | 37 | (3-2) | 55 | — | 0 | (5-1) | 6 | — | 0 | — | 0 |
| 148 | (1) | 8.5 | (2-1) | 36.5 | (3-2) | 54 | — | 0 | (5-4) | 1 | — | 0 | — | 0 |
| 149 | (1) | 2 | (2-1) | 20 | (3-2) | 58 | — | 0 | — | 0 | (6-3) | 20 | — | 0 |
| 150 | (1) | 3 | (2-1) | 30 | (3-2) | 20 | — | 0 | — | 0 | (6-4) | 47 | — | 0 |
| 151 | (1) | 9.5 | (2-1) | 36.5 | (3-2) | 29 | — | 0 | — | 0 | — | 0 | (7) | 25 |
| 152 | (1) | 2 | (2-1) | 31 | (3-2) | 20 | — | 0 | — | 0 | — | 0 | (7) | 47 |

The finished dye products in Examples 142-152 were subject to performance test.

The detailed test procedures are as follows:

In accordance with the method similar with that described in GB/T2394-2003, the finished dye products of Examples 142-152 were weighed in an amount of 0.5 g, and added into 250 ml of water respectively to prepare disperse dye suspensions. 30 ml of each suspension was sucked up and mixed with 70 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to washing, the compatibility and the content of chlorophenol of the samples were determined using GB/T3921-2008, the method described in Example 130 and GB/T18414.1-2006. The results are shown in Table 70.

TABLE 70

| Example | Fastness to washing | Compatibility | Content of chlorophenol |
|---|---|---|---|
| 142 | 5 | II | <0.05 |
| 143 | 5 | I | <0.05 |
| 144 | 5 | I | <0.05 |
| 145 | 5 | I | <0.05 |
| 146 | 5 | I | <0.05 |
| 147 | 5 | I | <0.05 |
| 148 | 5 | I | <0.05 |
| 149 | 5 | II | <0.05 |
| 150 | 5 | II | <0.05 |
| 151 | 5 | II | <0.05 |
| 152 | 5 | II | <0.05 |

Examples 153-154

According to the formulation shown in Table 71, and the finished dye product were prepared.

The finished dye products in Examples 153 and 154 were subjected to performance test.

TABLE 71

Unit: g

| | Component A | | Component B | | Component C | | Component D | | Component E | | Component F | | Component G | |
|---|---|---|---|---|---|---|---|---|---|---|---|---|---|---|
| Example | Formula | Weight | Formula | Weight | Formula | Weight | Formula | Weight | Formula | Weight | Formula | Weight | Formula | Weight |
| 153 | (1) | 72 | (2-1) | 7 | (3-2) | 20 | — | 0 | — | 0 | (6-1) | 1 | — | 0 |
| 154 | (1) | 72 | (2-1) | 7 | (3-2) | 20 | — | 0 | — | 0 | — | 0 | (7) | 1 |

The detailed test procedures are as follows:

In accordance with the method similar with that described in GB/T2394-2003, the finished dye products of Examples 153 and 154 were weighed in an amount of 0.5 g, and added into 250 ml of water respectively to prepare disperse dye suspensions. 30 ml of each suspension was sucked up and mixed with 70 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight, the fastness to washing and the content of chlorophenol of the samples were determined using AATCC16-2004, GB/T3921-2008, and GB/T18414.1-2006. The results are shown in Table 72.

TABLE 72

| Example | Fastness to sunlight | Fastness to washing | Content of chlorophenol |
|---------|----------------------|---------------------|-------------------------|
| 153     | 3                    | 5                   | <0.05                   |
| 154     | 3                    | 5                   | <0.05                   |

Examples 155-163

According to the formulation shown in Table 73, and the finished dye product were prepared.

TABLE 73

|  | Component A | | Component B | | Component C | | Component D | | Component E | | Component F | | Component G | Unit: g |
|---------|---------|--------|---------|--------|---------|--------|---------|--------|---------|--------|---------|--------|---------|--------|
| Example | Formula | Weight | Formula | Weight | Formula | Weight | Formula | Weight | Formula | Weight | Formula | Weight | Formula | Weight |
| 155 | (1) | 33 | (2-1) | 7 | (3-2) | 20 | (4-2) | 40 | — | 0 | — | 0 | — | 0 |
| 156 | (1) | 31 | (2-1) | 16 | (3-2) | 43 | (4-3) | 10 | — | 0 | — | 0 | — | 0 |
| 157 | (1) | 60 | (2-1) | 7 | (3-2) | 30 | (4-7) | 3 | — | 0 | — | 0 | — | 0 |
| 158 | (1) | 51 | (2-1) | 12 | (3-2) | 35 | — | 0 | (5-2) | 2 | — | 0 | — | 0 |
| 159 | (1) | 31 | (2-1) | 16 | (3-2) | 43 | — | 0 | (5-3) | 10 | — | 0 | — | 0 |
| 160 | (1) | 2 | (2-1) | 40 | (3-2) | 48 | — | 0 | — | 0 | (6-2) | 10 | — | 0 |
| 161 | (1) | 9.5 | (2-1) | 37.5 | (3-2) | 48 | — | 0 | — | 0 | (6-4) | 5 | — | 0 |
| 162 | (1) | 41 | (2-1) | 16 | (3-2) | 33 | — | 0 | — | 0 | — | 0 | (7) | 10 |
| 163 | (1) | 2 | (2-1) | 40 | (3-2) | 48 | — | 0 | — | 0 | — | 0 | (7) | 10 |

The finished dye products in Examples 155-163 were subjected to performance test.

The detailed test procedures are as follows:

In accordance with the method similar with that described in GB/T2394-2003, the finished dye products of Examples 155-163 were weighed in an amount of 0.5 g, and added into 250 ml of water respectively to prepare disperse dye suspensions. 30 ml of each suspension was sucked up and mixed with 70 ml of water. The pH value of the dyeing bath was adjusted to 5 with acetic acid, then the temperature was increased to 60° C. At the same time, 2 g of polyester fiber was put into the bath, and stained under high temperature and high pressure. The temperature was gradually increased to 130° C. within 35 min, kept for 45 min, then cooled down to 80° C., and the samples were collected.

The shade of the cloth samples was observed, and the fastness to sunlight, the fastness to washing, the compatibility and the content of chlorophenol of the samples were determined using AATCC16-2004, GB/T3921-2008, the method described in Example 130 and GB/T18414.1-2006. The results are shown in Table 74.

TABLE 74

| Example | Fastness to sunlight | Fastness to washing | Compatibility | Content of chlorophenol |
|---------|----------------------|---------------------|---------------|-------------------------|
| 155     | 2~3                  | 5                   | II            | <0.05                   |
| 156     | 2~3                  | 5                   | I             | <0.05                   |
| 157     | 3                    | 5                   | I             | <0.05                   |
| 158     | 3                    | 5                   | I             | <0.05                   |
| 159     | 2~3                  | 5                   | II            | <0.05                   |
| 160     | 2~3                  | 5                   | II            | <0.05                   |
| 161     | 2~3                  | 5                   | I             | <0.05                   |
| 162     | 3                    | 5                   | II            | <0.05                   |
| 163     | 2~3                  | 5                   | II            | <0.05                   |

What is claimed is:

1. A disperse dye composition, wherein the composition consists of the following components:

Component A as represented by formula (1):

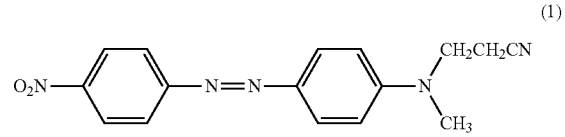

(1)

Component B, consists of one or more compounds as represented by formula (2):

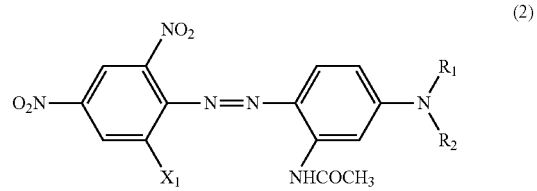

(2)

in formula (2), $X_1$ is bromine or chlorine; $R_1$, $R_2$ are each independently a $C_1$~$C_4$ alkyl group;

Component C, consists of one or more compounds as represented by formula (3):

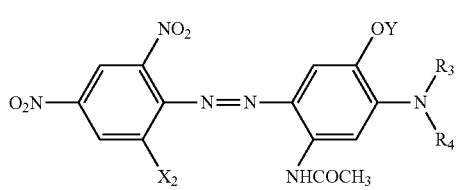
(3)

in formula (3), X$_2$ is bromine or chlorine, R$_3$, R$_4$ are each independently CH$_2$CH=CH$_2$, Y is a C$_1$~C$_4$ alkyl group, and one or more of the following Component D~F:

Component D, consisting of one or more compounds as represented by formula (4-1), (4-5) and (4-6):

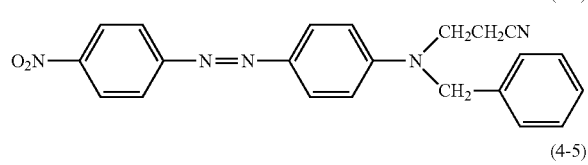
(4-1)

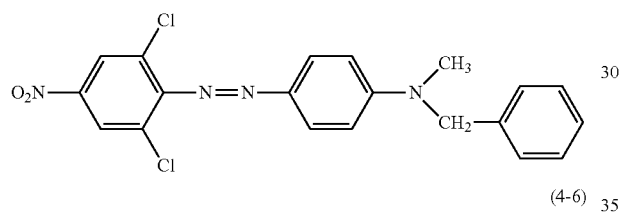
(4-5)

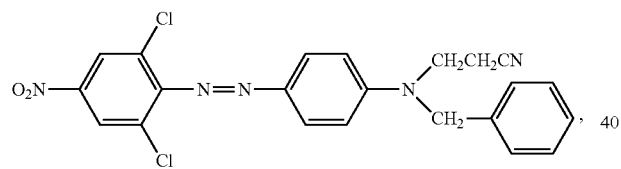
(4-6)

Component E, consisting of one or more compounds as represented by formula (5-1) and (5-3):

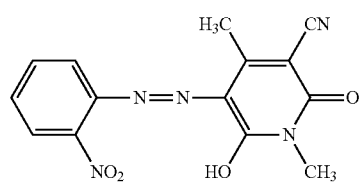
(5-1)

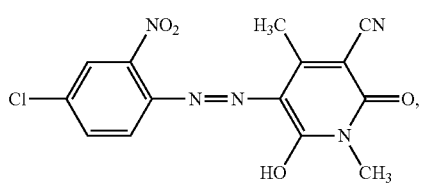
(5-3)

and

Component F, consisting of one compound as represented by formula (6-5):

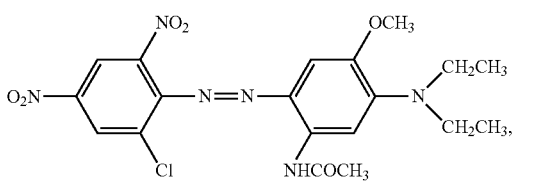
(6-5)

wherein based on a total weight of said composition, the composition consists of:

Component A in an amount of 2~73% by weight,
Component B in an amount of 7~40% by weight,
Component C in an amount of 20~58% by weight,
Component D in an amount of 2~6% by weight,
Component E in an amount of 2~6% by weight,
Component F in an amount of 1~5% by weight.

2. The disperse dye composition according to claim 1, wherein X$_2$ in formula (3) is chlorine.

3. The disperse dye composition according to claim 1, wherein Component B is a compound as represented by formula (2-1):

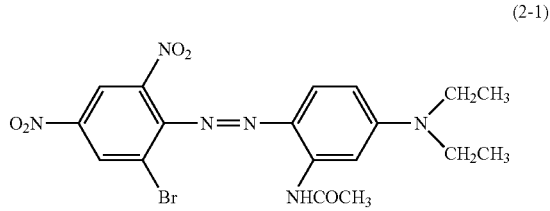
(2-1)

Component C is a compound as represented by formula (3-2):

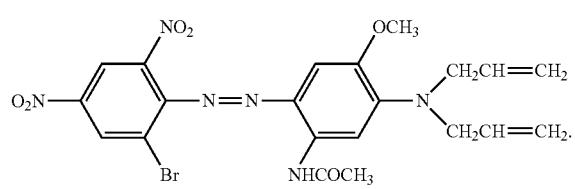
(3-2)

4. The disperse dye composition according to claim 1, wherein said Component B consists of one or two of the following compounds:

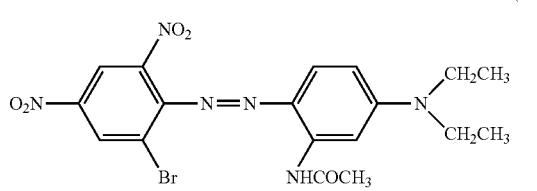
(2-1)

-continued (2-2)

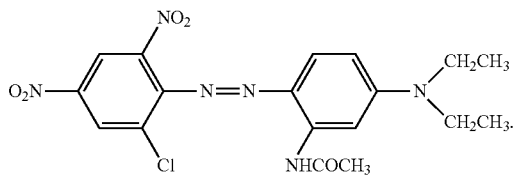

5. The disperse dye composition according to claim 1, wherein said Component C consists of one or more of the following compounds:

(3-1)

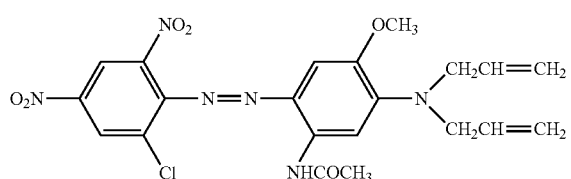

(3-2)

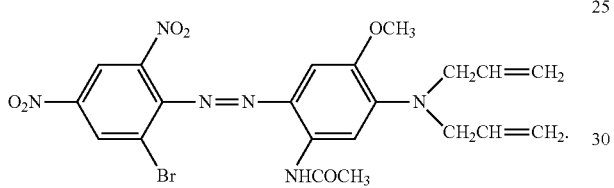

6. The disperse dye composition according to claim 2, wherein said Component C is a compound of the following formula (3-1):

(3-1)

7. The disperse dye composition according to claim 1, wherein Component B consists of one or two compounds as represented by formula (2-1) and formula (2-2):

(2-1)

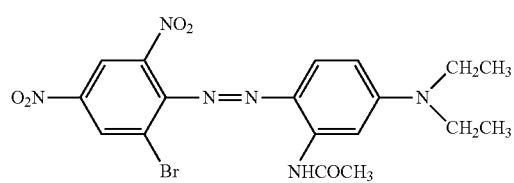

-continued (2-2)

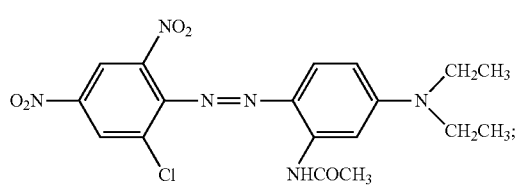

and

Component C consists of one or more of compounds as represented by the following formulae (3-1) to (3-2):

(3-1)

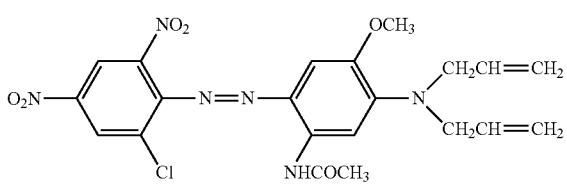

(3-2)

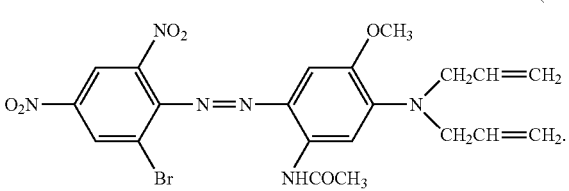

8. A disperse dye, wherein said disperse dye consists of the disperse dye composition according to claim 1 and one or more auxiliary materials, wherein the auxiliary materials are water and optionally assistants selected from the group consisting of a naphthalenesulfonic acids-formaldehyde condensate, lignin sulfonate, sodium sulphate, a surfactant, a bactericide and other dispersion agents for dyes.

9. The disperse dye according to claim 8, wherein said assistants are present.

10. The disperse dye according to claim 9, wherein a weight ratio of the assistants to the disperse dye composition is 0.3 to 4:1.

11. The disperse dye according to claim 8, wherein the disperse dyes are present as liquid with a solid content of 20 to 50% after grinding by a sand mill or a grinder; or the disperse dyes are present as powder or particles with a solid content of 87 to 96% after spray drying.

* * * * *